US012607600B2

(12) United States Patent
Toyoda et al.

(10) Patent No.: US 12,607,600 B2
(45) Date of Patent: Apr. 21, 2026

(54) MASS SPECTROMETRY DEVICE, AND MASS SPECTROMETRY METHOD

(71) Applicant: OSAKA UNIVERSITY, Osaka (JP)

(72) Inventors: Michisato Toyoda, Osaka (JP);
Toshinobu Hondo, Osaka (JP); Hiroshi Nakayama, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 332 days.

(21) Appl. No.: 18/274,947

(22) PCT Filed: Feb. 4, 2022

(86) PCT No.: PCT/JP2022/004433
§ 371 (c)(1),
(2) Date: Jul. 28, 2023

(87) PCT Pub. No.: WO2022/168943
PCT Pub. Date: Aug. 11, 2022

(65) Prior Publication Data
US 2024/0310327 A1      Sep. 19, 2024

(30) Foreign Application Priority Data
Feb. 5, 2021      (JP) ................................. 2021-017547

(51) Int. Cl.
*G01N 27/62*      (2021.01)
*G01N 30/02*      (2006.01)
(Continued)

(52) U.S. Cl.
CPC .......... *G01N 27/62* (2013.01); *H01J 49/0468* (2013.01); *H01J 49/0495* (2013.01);
(Continued)

(58) Field of Classification Search
CPC ........ G01N 27/62; G01N 30/02; G01N 30/20; G01N 30/72; H01J 49/0468; H01J 49/0495; H01J 49/14; H01J 49/26; H01J 49/04
See application file for complete search history.

(56) References Cited

U.S. PATENT DOCUMENTS 4,984,602 A      1/1991   Saito et al.

FOREIGN PATENT DOCUMENTS

JP      07-15458      2/1995

OTHER PUBLICATIONS

Hondo et al., "Analysis of Nonvolatile Molecules in Supercritical Carbon Dioxide Using Proton-Transfer-Reaction Ionization Time-of-Flight Mass Spectrometry", Apr. 23, 2021, vol. 93, Issue 17 (Year: 2021).*

(Continued)

*Primary Examiner* — Robert H Kim
(74) *Attorney, Agent, or Firm* — Casimir Jones, S.C.; Robert A. Goetz

(57)      ABSTRACT

Provided is a technique to carry out mass spectrometry of a wide variety of subject compounds to be analyzed, each of which is extracted in a supercritical fluid. A mass spectrometer (1) includes: a supercritical fluid introduction section (3) for introducing and releasing, to vacuum, a supercritical fluid in which a subject compound for mass spectrometry is contained (extracted); an ionization section (4) that ionizes the subject compound which is extracted in the supercritical fluid, the ionization being carried out in the vacuum by a molecular reaction involving proton transfer; and a mass measurement section (5) that measures a mass of the subject compound which has been ionized.

11 Claims, 20 Drawing Sheets

(51) Int. Cl.
    *H01J 49/04*     (2006.01)
    *H01J 49/14*     (2006.01)
    *H01J 49/26*     (2006.01)

(52) U.S. Cl.
    CPC .............. *H01J 49/14* (2013.01); *H01J 49/26* (2013.01); *G01N 30/02* (2013.01)

(56)            References Cited

OTHER PUBLICATIONS

Written Opinion for PCT/JP2022/004433 and its English translation. Mar. 29, 2022. 7 pages.
International Search Report for PCT/JP2022/004433 and its English Translation. Mar. 29, 2022. 4 pages.
Hondo, Toshinobu, et al., Analysis of Nonvolatile Molecules in Supercritical Carbon Dioxide Using Proton-Transfer-Reaction Ionization Time-of-Flight Mass Spectrometry. Anal Chem. Apr. 23, 2021;93(17):6589-6593.
Allowance for JP Patent Application No. 2022-579619, dated Mar. 5, 2024, 2 pages.

* cited by examiner

FIG. 2 from SFE/SFC from SFE/SFC from SFE/SFC to PTR

γ-Oryzanol A [M-H]⁻ (m/z 601.425) Flow Injection Profile $$[OH]^- + R \longrightarrow [R\text{-}H]^- + H_2O$$

$$R = \gamma\text{-Oryzanol A}$$

MASS SPECTROMETRY DEVICE, AND MASS SPECTROMETRY METHOD

STATEMENT OF RELATED APPLICATIONS

This application is a national phase application under 35 U.S.C. § 371 of PCT International Application No.: PCT/JP2022/004433, filed on Feb. 4, 2022, which claims the benefit of JP Patent Application No. 2021-017547, filed Feb. 5, 2021, the contents of each of which are incorporated by reference herein.

TECHNICAL FIELD

An aspect of the present invention relates to a mass spectrometer and a mass spectrometric method with respect to a supercritical fluid in which a subject compound for mass spectrometry is extracted.

BACKGROUND ART

An extraction/chromatographic separation/data-acquisition device is known which (i) extracts a soluble substance from a sample using supercritical fluid extraction (SFE) coupled with or without a supercritical fluid chromatography (SFC), (ii) introduces the extract on-line to chromatography and separates the extract into components, and (iii) separately collects the components (Patent Literature 1).

Moreover, a mass spectrometer with a proton transfer reaction (PTR) ionization ion source for measuring volatile organic oxides in the atmosphere is known as a conventional technique.

CITATION LIST

Patent Literature

[Patent Literature 1]
Japanese Examined Patent Application Publication, Tokukouhei, No. 7-15458 (1995) (U.S. Pat. No. 1,987,559, specification)

SUMMARY OF INVENTION

Technical Problem

In conventional SFE/SFC-mass spectrometers (MS), any of the following methods have been widely employed to transfer analytes suspended (dissolved) in a supercritical state of a fluid that is introduced to atmospheric pressure: a method in which an organic solvent such as ethanol or acetonitrile is introduced as a modifier, and then sprayed and ionized as electrospray ionization (ESI); and a method of ionization using atmospheric pressure chemical ionization (APCI). The ESI needs the presence of a polar organic solvent, whereas the APCI does not. Nevertheless, the addition of an organic solvent such as toluene or isopropyl alcohol has been necessary for the purpose of avoiding deposition of a solute in a decompression process from a high-pressure supercritical fluid into atmospheric pressure prior to ionization. Accordingly, there has been a problem of impairing high column efficiency (high number of theoretical plates), which is an advantage of SFC, and impairing a characteristic of being capable of dealing with a wide variety of analyses by controlling only temperature and pressure, and consequently, comprehensiveness is lost.

It has been difficult or impossible to detect non-polar substances such as oils and fats, polycyclic aromatic hydrocarbons, linear chain hydrocarbons, polymers, and plasticizers in a conventional liquid chromatography mass spectrometer (LC-MS).

A conventional mass spectrometer having a PTR ionization ion source has been used for the purpose of sensitively measuring volatile organic compounds in the atmosphere, and the like. However, such a conventional mass spectrometer has not been used in measurement of polymeric compounds, especially substances which are low in volatility or do not volatilize, which are mainly dealt with by the SFE and the SFC.

That is, in most cases, a mass spectrometer using a PTR ionization ion source has been used for field measurement of volatile organic compounds (VOC) contained in the atmosphere, exhaust gases, and the like. In addition, there have been fewer examples in which such a mass spectrometer is used as an analysis device for substance separation and substance identification while being connected with liquid chromatography or gas chromatography.

An object of an aspect of the present invention is to realize a mass spectrometer and a mass spectrometric method that makes it possible to carry out mass spectrometry of a wide variety of subject compounds to be analyzed each of which is extracted in a supercritical fluid.

Solution to Problem

In order to attain the object, a mass spectrometer in accordance with an aspect of the present invention includes: a supercritical fluid introduction section that is provided for introducing and releasing, to vacuum, a supercritical fluid in which a subject compound for mass spectrometry is extracted; an ionization section that ionizes the subject compound which is extracted in the supercritical fluid, the ionization being carried out in the vacuum by a molecular reaction involving the proton transfer; and a mass measurement section that measures a mass of the subject compound which has been ionized.

In order to attain the object, a mass spectrometric method in accordance with an aspect of the present invention includes the steps of: introducing and releasing, to vacuum, a supercritical fluid in which a subject compound for mass spectrometry is extracted; ionizing the subject compound which is extracted in the supercritical fluid, the ionization being carried out in the vacuum by a molecular reaction involving proton transfer; and measuring a mass of the subject compound which has been ionized.

Advantageous Effects of Invention

According to an aspect of the present invention, it is possible to carry out mass spectrometry of wide variety of subject compounds to be analyzed, each of which is extracted in a supercritical fluid.

BRIEF DESCRIPTION OF DRAWINGS

FIG. 2 is an image showing a supercritical fluid introduction section in the mass spectrometer.

DESCRIPTION OF EMBODIMENTS

Embodiment 1

The following description will specifically discuss an embodiment of the present invention.

The term "supercritical fluid" refers to a substance which is in a state exceeding the critical temperature and critical pressure of a particular substance. Note, however, that, in this specification, the "supercritical fluid" also includes substances in a subcritical state that is important for application and a state of containing an entrainer.

Figure 1:
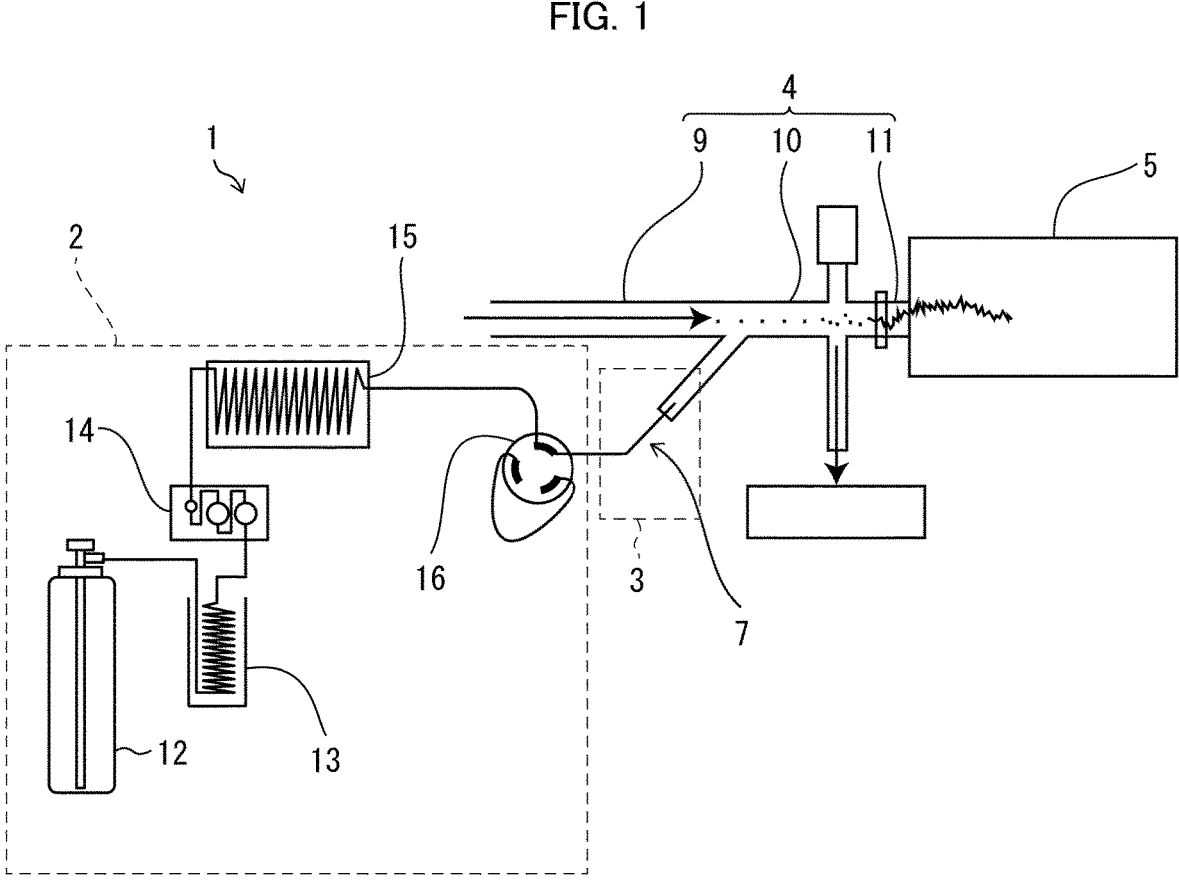
FIG. 1 is a configuration diagram illustrating a mass spectrometer in accordance with Embodiment 1.

FIG. 1 is a configuration diagram illustrating a mass spectrometer 1 in accordance with Embodiment 1.

The mass spectrometer 1 includes a supercritical fluid extraction section 2, a supercritical fluid introduction section 3, an ionization section 4, and a mass measurement section 5. The supercritical fluid extraction section 2 generates a supercritical fluid, dissolves a subject compound for mass spectrometry in the supercritical fluid, and extracts the subject compound extracted in the supercritical fluid. The supercritical fluid introduction section 3 introduces and releases, to vacuum, the supercritical fluid in which the subject compound is extracted. The ionization section 4 ionizes, in the vacuum, the subject compound extracted in the supercritical fluid by a molecular reaction involving proton transfer. The mass measurement section 5 measures a mass of the ionized subject compound.

The ionization section 4 includes a regent ion generation section 9, a reaction section 10, and an introduction section 11. The regent ion generation section 9 generates reagent ions for adding a proton to the subject compound or for abstracting a proton out of the subject compound. The reaction section 10 is provided for causing a molecular reaction of the reagent ions with the subject compound. The introduction section 11 introduces the subject compound ionized by this molecular reaction to the mass measurement section 5.

The molecular reaction in which a proton is added to the subject compound is represented as follows:

$$[H_3O]^+ + R \rightarrow [RH]^+ + H_2O \qquad \text{(Formula 1),}$$

where R is a subject compound. In a case where a proton affinity of the subject compound is greater than a proton affinity of water, the reaction in Formula 1 above proceeds rightward to add a proton to the subject compound.

The molecular reaction in which a proton is abstracted out of the subject compound is represented as follows:

$$[OH]^- + RH \rightarrow [R]^- + H_2O \qquad \text{(Formula 2),}$$

where RH is a subject compound. Examples of the subject compound include γ-oryzanol (γ-Oryzanol A).

The supercritical fluid introduction section 3 includes a heating section 7 provided for heating a supercritical fluid and introducing the supercritical fluid to vacuum in the ionization section 4.

It is preferable that the reagent ions include $H_3O^+$. Examples of the reagent ions include $NH_4+$, $OH^-$, and the like, as well as $H_3O^+$. Examples of the reaction section 10 include a flow tube and a drift tube. The proton affinity of the supercritical fluid is preferably not greater than the proton affinity of water.

It is preferable that the supercritical fluid includes oxygen dioxide having a proton affinity that is not greater than the proton affinity of water. The supercritical fluid may be nitrogen, oxygen, methane, or argon which has a proton affinity not greater than the proton affinity of water. The supercritical fluid may also be xenon, water, or ammonia.

It is preferable that the proton affinity of the subject compound is greater than the proton affinity of water.

The ionization section 4 preferably ionizes the subject compound by proton transfer from $H_3O^+$ to the subject compound.

The mass spectrometer 1 is a configuration example of flow injection-PTR ionization mass spectrometry using supercritical carbon dioxide as a carrier.

The supercritical fluid extraction section 2 includes (i) a cylinder 12 for supplying carbon dioxide, (ii) a cooling section 13 for cooling carbon dioxide supplied from the cylinder 12, (iii) a pump 14 for pressurizing carbon dioxide cooled by the cooling section 13, (iv) a thermostat type oven 15 that heats up carbon dioxide pressurized by the pump 14 that the carbon dioxide to be supercritical state, and (v) a flow channel switching valve 16 for extracting a subject compound for mass spectrometry in the supercritical carbon dioxide provided from the oven 15.

In the flow channel switching valve 16, an injector valve used in typical high-performance liquid chromatography is used (i.e., replaced), and thus a subject compound extracted in hexane or methanol is injected into the supercritical carbon dioxide.

The cooling section 13 cools carbon dioxide to −25° C. by, for example, an ethanol/dry ice bath. The pump 14 supplies liquid carbon dioxide to the oven 15.

Examples of a method in which the reagent ion generation section 9 generates reagent ions include corona discharge, a method of irradiation with thermoelectrons, a method of irradiation with radial rays from a radioactive substance, glow discharge, and the like.

A degree of vacuum in the ionization section 4 serving as a PTR ion source is often set to approximately 1 Pa to 100 Pa.

As the mass measurement section 5, it is possible to use a known mass spectrometer. Moreover, as the supercritical fluid extraction section 2, it is possible to use a known device for generating a supercritical fluid.

Figure 2:
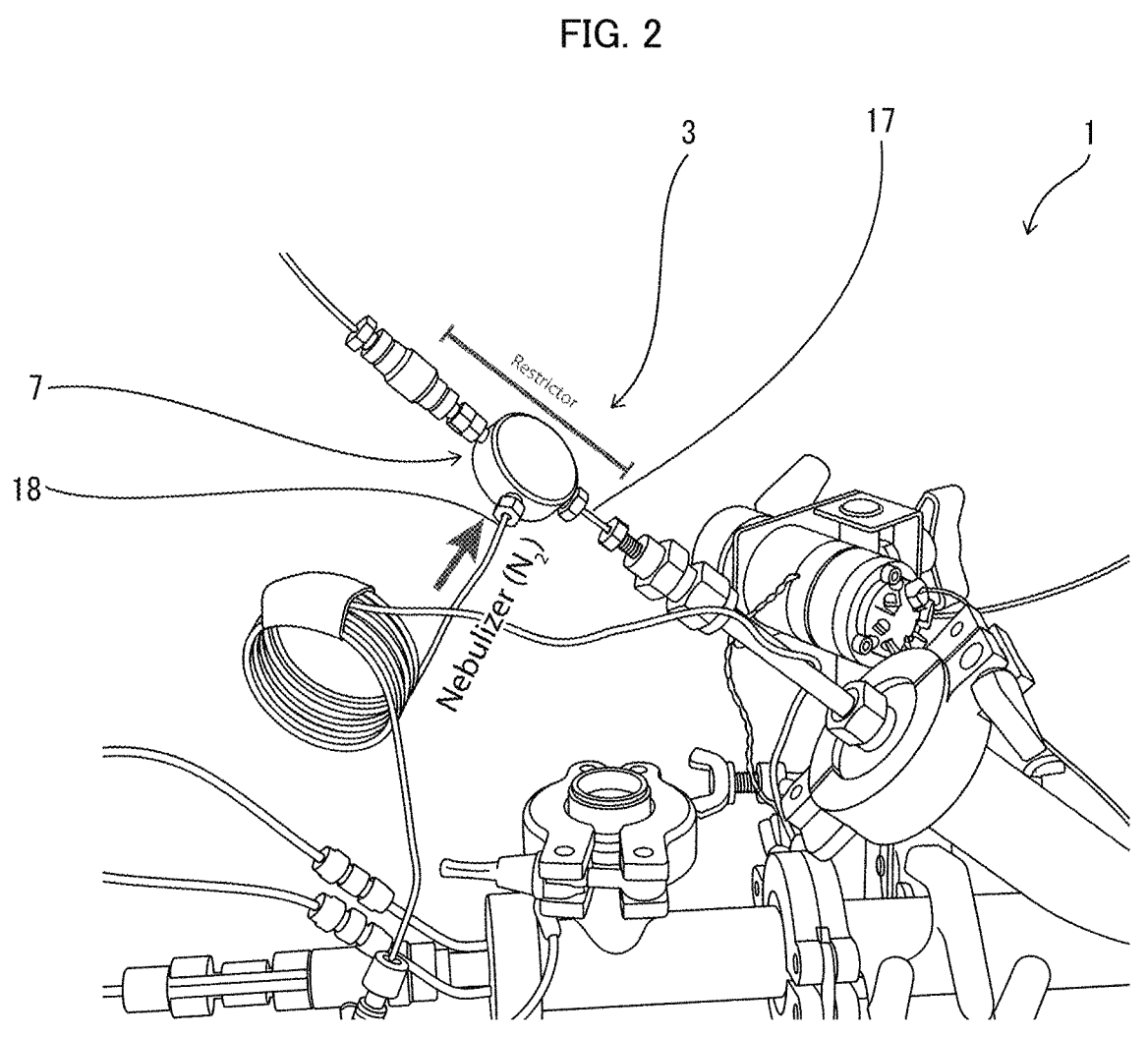
Figure 3:
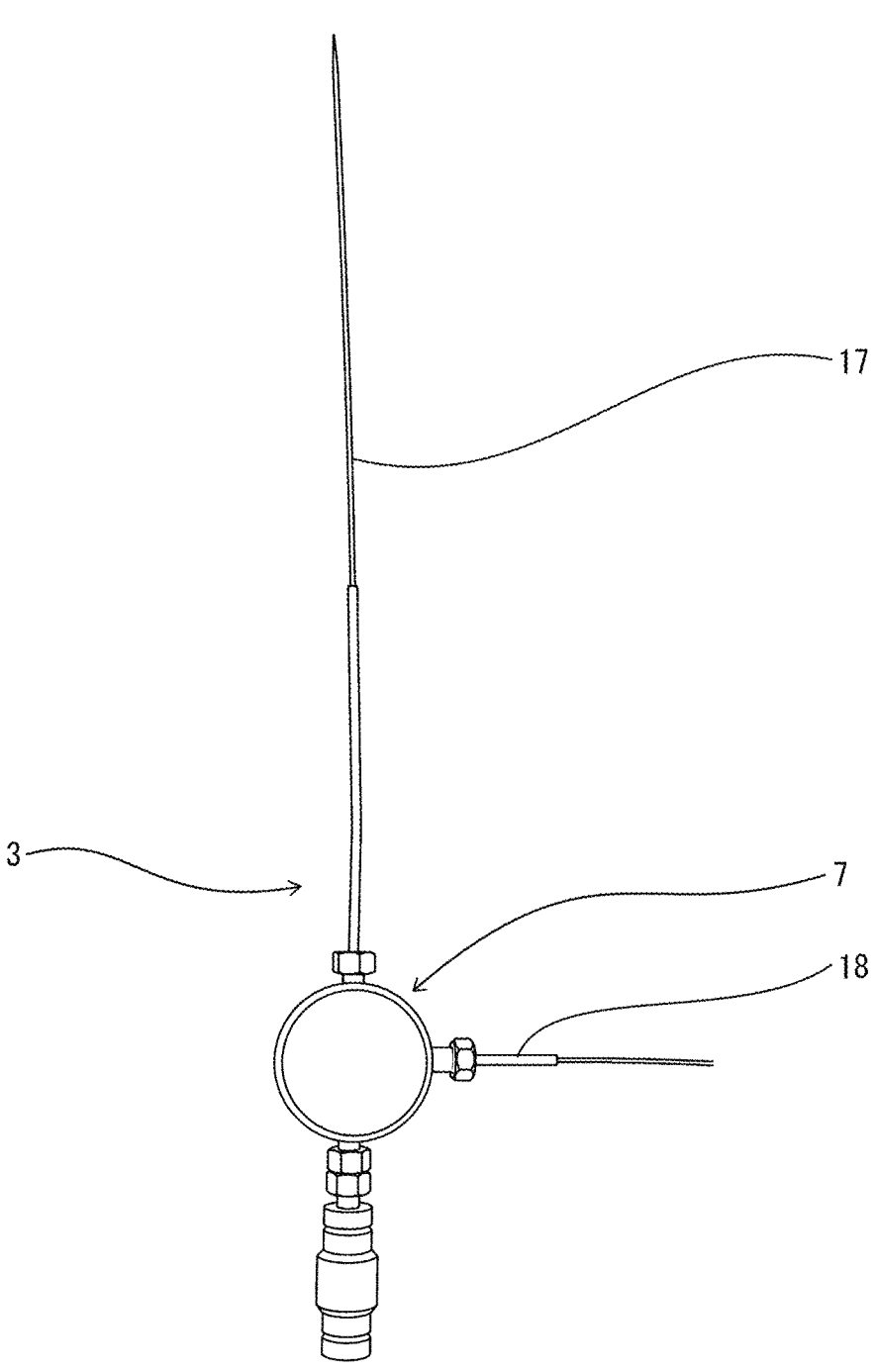
FIG. 3 is an image showing a heating section provided in the supercritical fluid introduction section.
Figure 4:
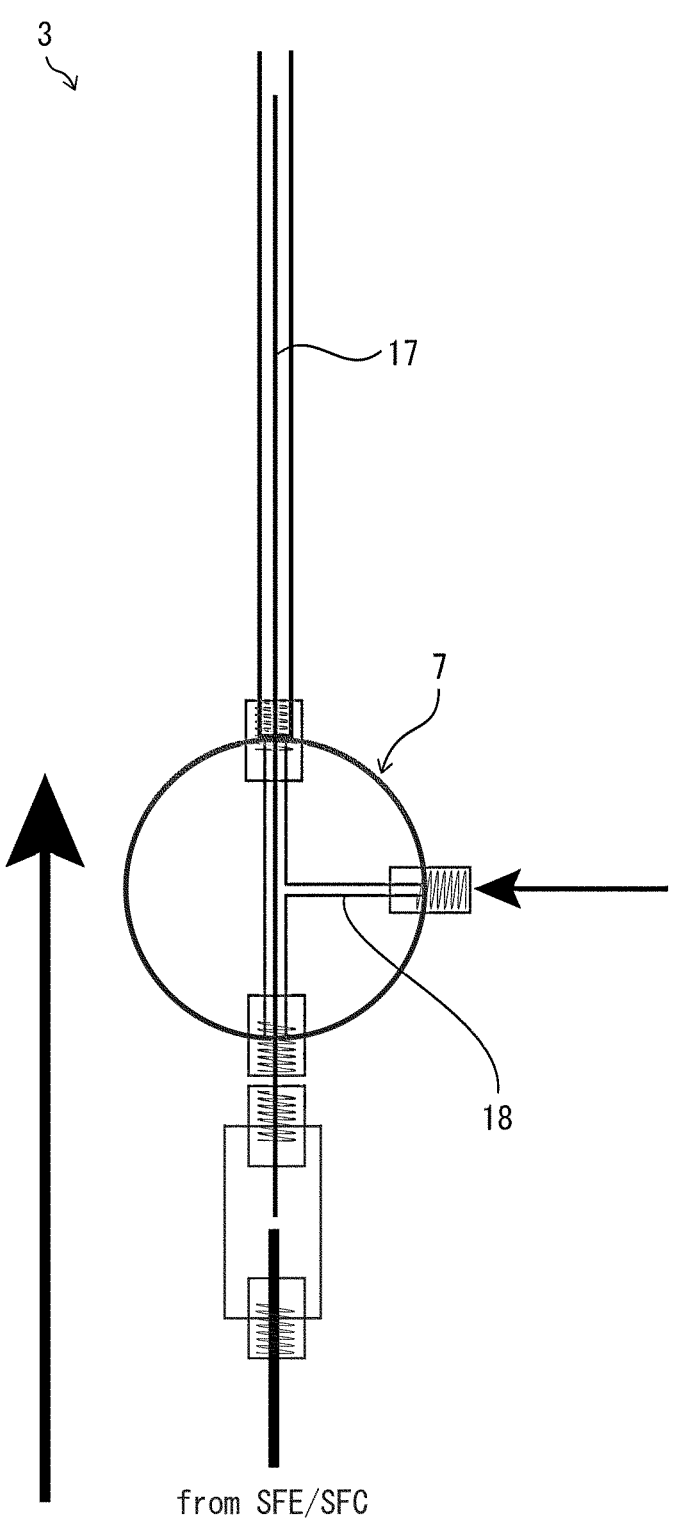
FIG. 4 is a configuration diagram illustrating the heating section.

FIG. 2 is an image showing the supercritical fluid introduction section 3 in the mass spectrometer 1. FIG. 3 is an image showing the heating section 7 provided in the supercritical fluid introduction section 3. FIG. 4 is a configuration diagram illustrating the heating section 7.

The supercritical fluid introduction section 3 includes an introduction tube 17 through which supercritical carbon dioxide in which a subject compound is extracted flows toward the reaction section 10 in the ionization section 4. The introduction tube 17 is constituted by, for example, capillaries having a diameter of 20 μm. The heating section 7 is provided midway through the introduction tube 17, and includes a feeding tube 18 for feeding heated gas that is blown onto an outer periphery of the introduction tube 17 so as to heat up supercritical carbon dioxide flowing through the introduction tube 17. It is preferable that the heated gas is a gas having a proton affinity lower than that of water and is, for example, nitrogen or carbon dioxide. A temperature of the heated gas can be, for example, approximately 60° C.

The following description will discuss operation of the mass spectrometer 1 which is thus configured.

First, supercritical carbon dioxide is generated by the cylinder 12, the cooling section 13, the pump 14, and the oven 15. Then, a subject compound for mass spectrometry is extracted in the supercritical carbon dioxide by the flow channel switching valve 16, and the subject compound is extracted (supercritical fluid extraction step).

Then, the supercritical carbon dioxide in which the subject compound is extracted is introduced and released to vacuum in the reaction section 10 while being heated by the heating section 7 (supercritical fluid introduction step).

Next, the subject compound extracted in the supercritical carbon dioxide is ionized in the vacuum in the reaction section 10 by a molecular reaction involving proton transfer (ionization step). This ionization step may include a reagent ion generation step, a sample introduction step, and a reaction step. First, reagent ions for adding a proton to the subject compound or for abstracting a proton out of the subject compound are generated by the reagent ion generation section 9 (reagent ion generation step). The reagent ions react molecularly with the subject compound (reaction step), and the subject compound ionized by this molecular reaction is introduced to the mass measurement section 5 (introduction step).

The supercritical carbon dioxide in which the subject compound is extracted has a proton affinity lower than that of water. Therefore, the supercritical carbon dioxide is not ionized in the vacuum in the reaction section 10. Therefore, the supercritical carbon dioxide does not interfere with ionization of the subject compound, and it is therefore possible to efficiently ionize the subject compound.

Subsequently, the mass measurement section 5 measures a mass of the subject compound which has been ionized by the reaction section 10 (mass measurement step).

Thus, the subject compound extracted in the supercritical fluid is introduced to the vacuum, and the subject compound is ionized in the vacuum by a molecular reaction involving proton transfer. Therefore, it is possible to detect, with high sensitivity, non-polar substances such as oils and fats, polycyclic aromatic hydrocarbons, linear chain hydrocarbons, polymers, and plasticizers that have been difficult or impossible to detect by a conventional liquid chromatography mass spectrometer (LC-MS).

A conventional mass spectrometer with PTR deals with volatile organic oxides in the atmosphere. However, according to the present embodiment, a nonvolatile substance is extracted in a supercritical fluid, introduced to vacuum, and ionized, and thus a mass of the nonvolatile substance can be analyzed.

With the configuration, while utilizing material selectivity of supercritical fluid extraction, it is possible to carry out analysis rapidly and in a short operating time without chromatographic separation.

Conventionally, extraction experiments have been carried out while varying conditions, and changes in composition of the extracts have been confirmed off-line by analysis in a laboratory. However, it is possible to observe elution conditions on-line in real time, which allows rapid determination of operating conditions for a supercritical fluid extraction plant. Conventionally, similar operations have been carried out using methods of measuring ultraviolet/visible wavelength (UV/Vis) spectra or fluorescence spectra. However, for oleaginous substances and linear chain hydrocarbons of crude oil components, it has been impossible to ascertain compositional changes in the eluates by those methods.

In PTR ionization, a high sensitivity is obtained because a sample is introduced to a closed space under vacuum. In addition, fragmentation of ions is unlikely to occur because the PTR ionization is chemical ionization utilizing an ionic molecular reaction.

In addition, a reaction speed is increased when a sample molecule which is present, in a concentrated state, in a band having a small volume that is not greater than microliters reacts with an ionizing reagent. Therefore, the sensitivity is expected to be improved.

Figure 5:
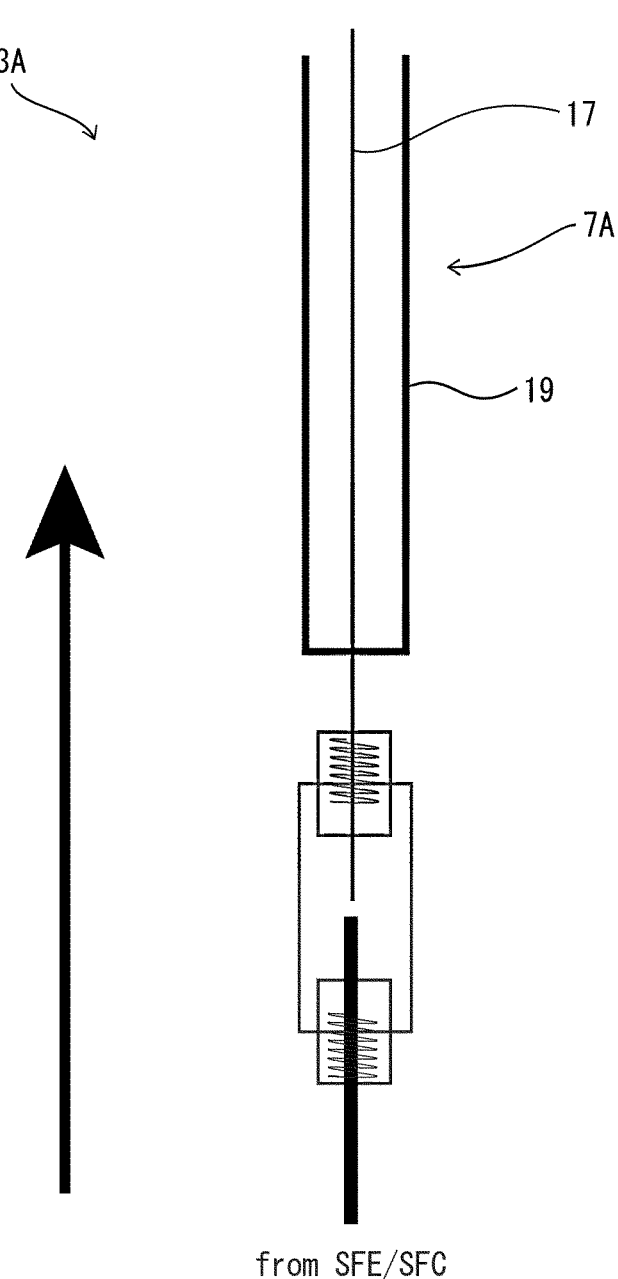
FIG. 5 is a configuration diagram illustrating another example of the heating section.

FIG. 5 is a configuration diagram illustrating another example of the heating section. Constituent elements similar to those described above will be given the same reference signs, and detailed descriptions of such constituent elements will not be repeated here.

A supercritical fluid introduction section 3A includes an introduction tube 17 through which supercritical carbon dioxide in which a subject compound is contained flows toward a reaction section 10 in an ionization section 4, and a heating section 7A that heats up the supercritical carbon dioxide flowing through the introduction tube 17. The heating section 7A includes a heater block 19 that is provided to cover the outer periphery of the introduction tube 17.

Figure 6:
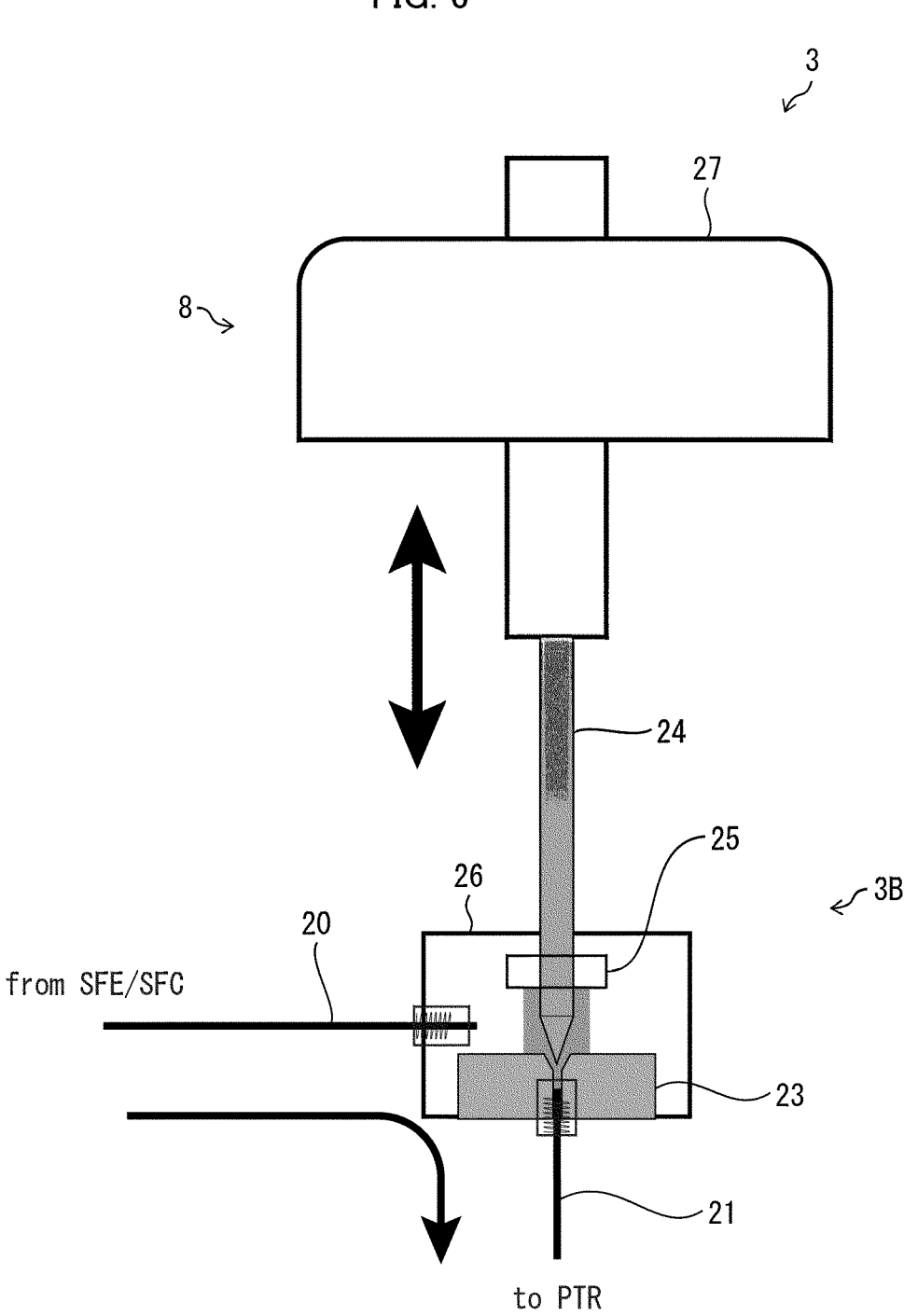
FIG. 6 is a diagram schematically illustrating a configuration of a solenoid valve provided in the supercritical fluid introduction section.
Figure 7:
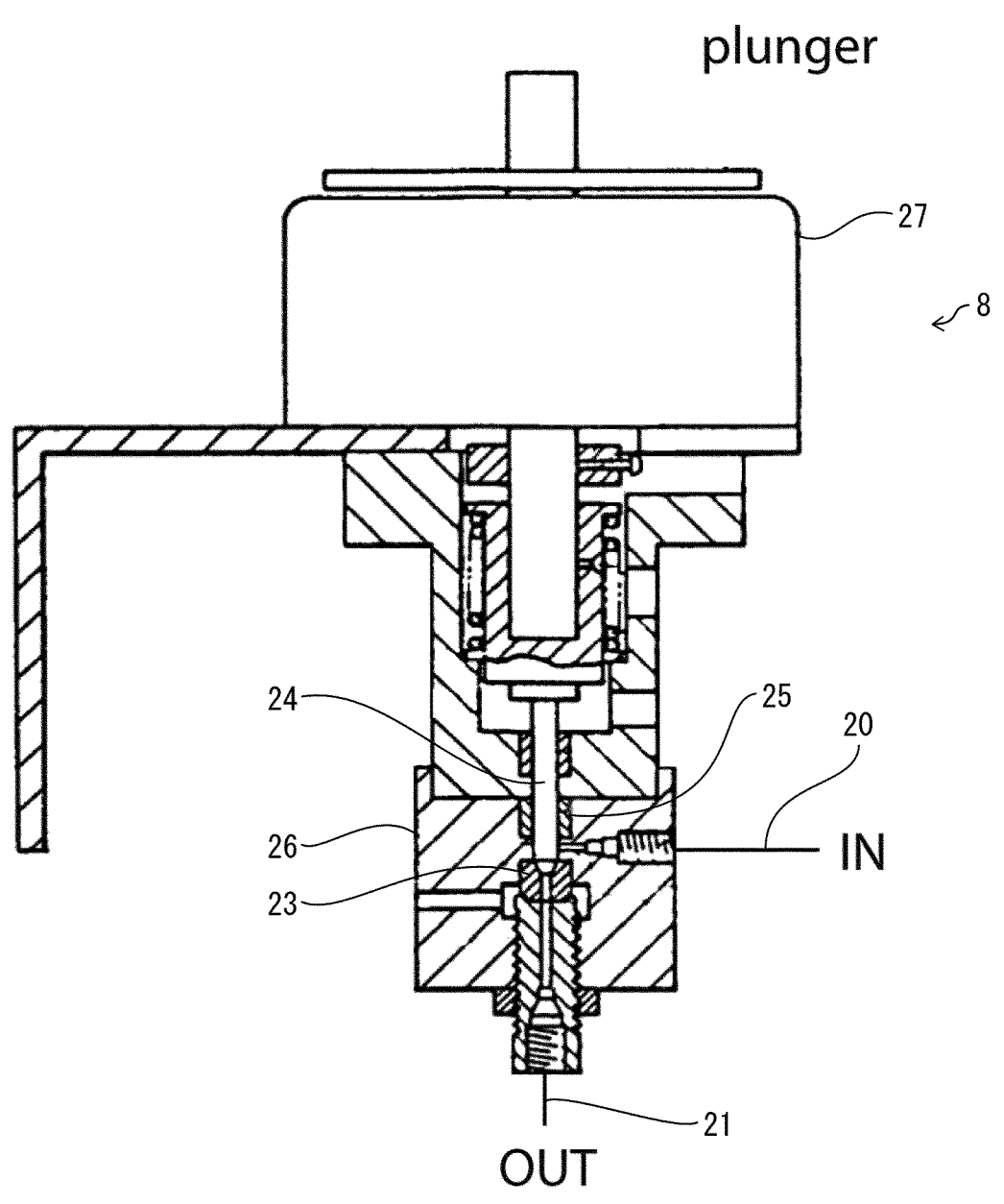
FIG. 7 is a diagram specifically illustrating a configuration of the solenoid valve.

FIG. 6 is a diagram schematically illustrating a configuration of a solenoid valve 8 provided in the supercritical fluid introduction section 3. FIG. 7 is a diagram specifically illustrating a configuration of the solenoid valve 8. Constituent elements similar to those described above will be given the same reference signs, and detailed descriptions of such constituent elements will not be repeated here.

The solenoid valve 8 may be provided to the supercritical fluid introduction section 3 instead of the heating section 7 or 7A described above. The solenoid valve 8 is provided for introducing a supercritical fluid to vacuum in the reaction section 10 while maintaining pressure of the supercritical fluid before passing through the solenoid valve.

The solenoid valve 8 includes a solenoid 27, a vacuum chamber 26, a valve stem 24 that is coupled to the solenoid 27 and inserted through an air tight seal 25 into the vacuum chamber 26, and a valve seat 23 provided in the vacuum chamber 26 in association with the valve stem 24.

The supercritical fluid introduction section 3 includes an introduction tube 20 that is coupled to the supercritical fluid extraction section 2 and inserted into the vacuum chamber 26, and an introduction tube 21 that is coupled to the valve seat 23 of the vacuum chamber 26 and connected to the reaction section 10 of the ionization section 4.

Figure 8:
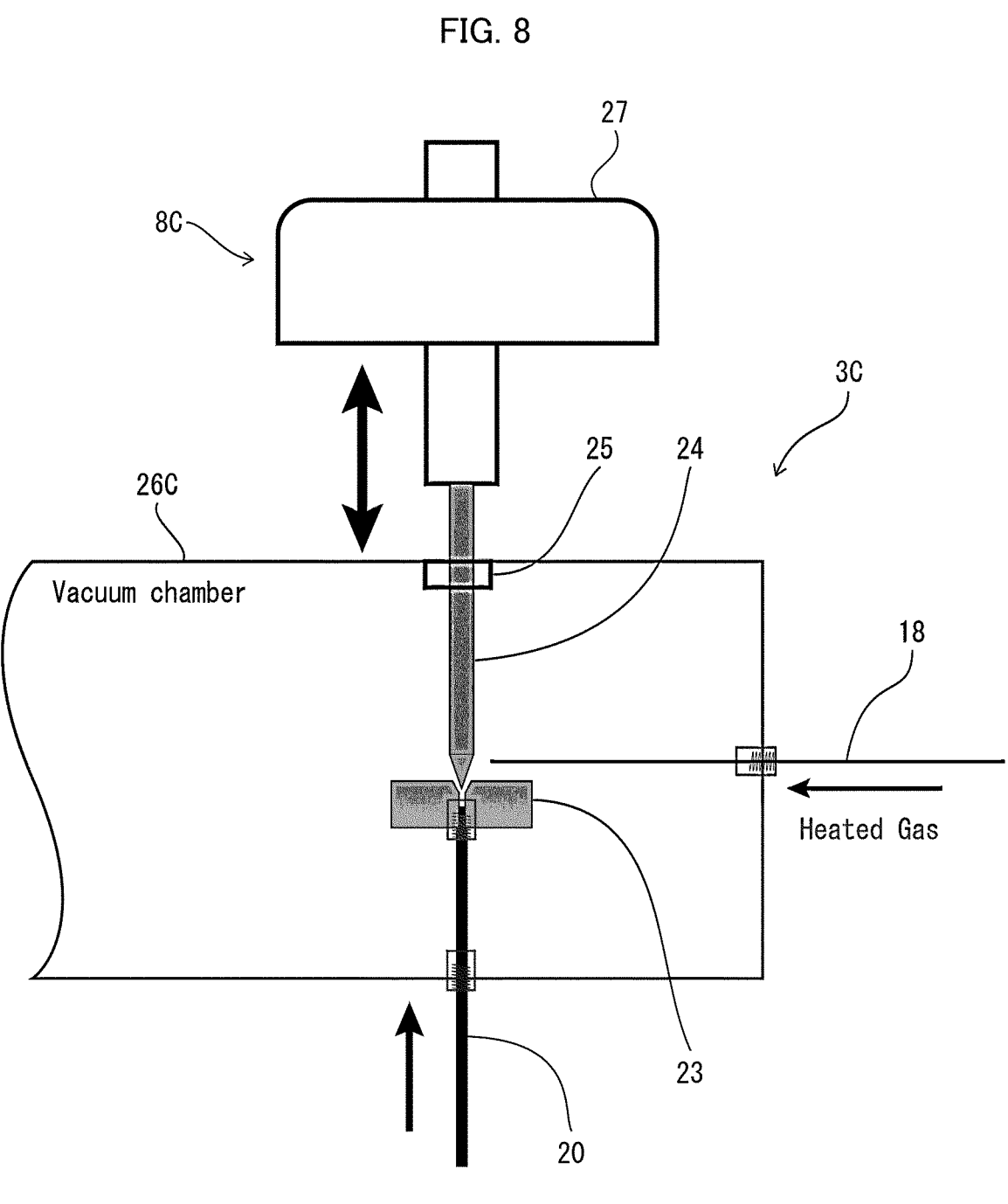
FIG. 8 is a diagram schematically illustrating a configuration of another example of the solenoid valve.
Figure 9:
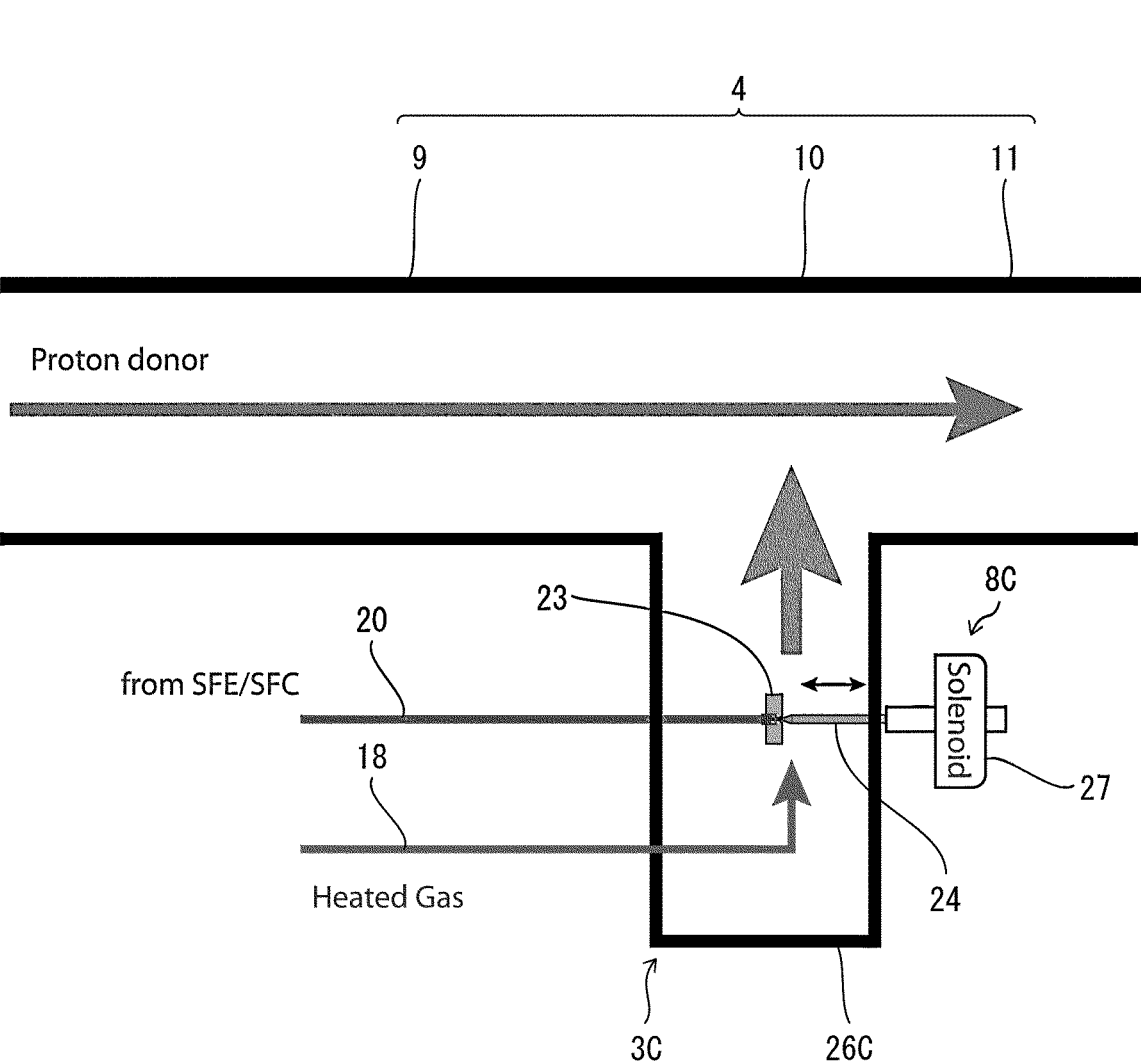
FIG. 9 is a diagram illustrating a relation between another example of the solenoid valve and an ionization section.

FIG. 8 is a diagram schematically illustrating a configuration of another example of the solenoid valve. FIG. 9 is a diagram illustrating a relation between another example of the solenoid valve and the ionization section 4. Constituent elements similar to those described above will be given the same reference signs, and detailed descriptions of such constituent elements will not be repeated here.

A supercritical fluid introduction section 3C includes a vacuum chamber 26C that communicates with an ionization section 4, a solenoid valve 8C for introducing a supercritical fluid to vacuum in a reaction section 10 provided in the ionization section 4 while maintaining pressure of the supercritical fluid, and an introduction tube 20 that is connected to a flow channel switching valve 16 in a supercritical fluid extraction section 2 and inserted into the vacuum chamber 26C. The solenoid valve 8C includes a solenoid 27, a valve stem 24 that is coupled to the solenoid 27 and inserted through an air tight seal 25 into the vacuum chamber 26C, and a valve seat 23 provided in the vacuum chamber 26C in association with the valve stem 24.

The supercritical fluid introduction section 3C further includes a feeding tube 18 for feeding heated gas that heats up the supercritical fluid flowing out of the introduction tube 20 through the valve seat 23.

The valve stem 24 may be driven by air pressure instead of the solenoid 27.

Alternatively, another type of valve may be used instead of the solenoid valve.

Figure 10:
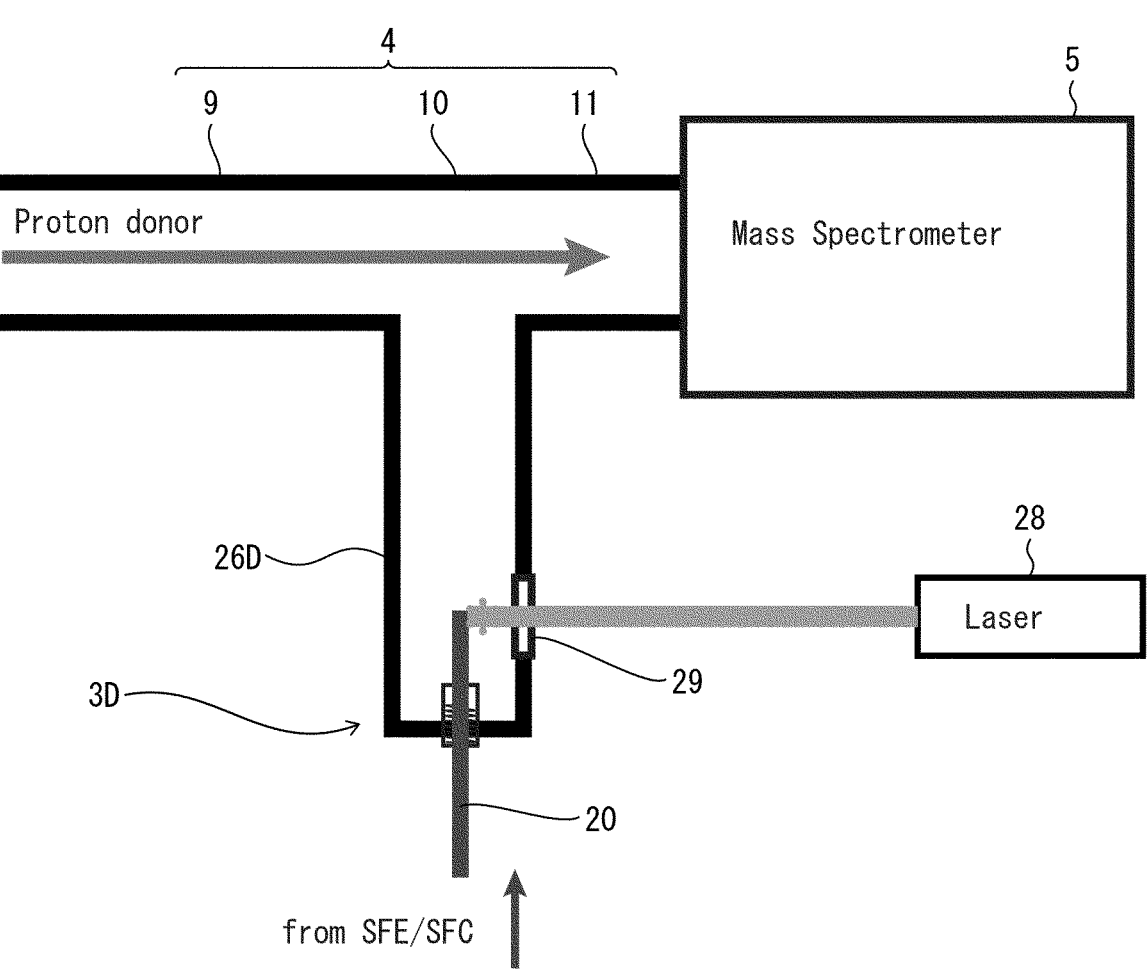
FIG. 10 is a diagram illustrating still another example of the heating section.

FIG. 10 is a diagram illustrating still another example of the heating section. Constituent elements similar to those described above will be given the same reference signs, and detailed descriptions of such constituent elements will not be repeated here.

A supercritical fluid introduction section 3D includes a vacuum chamber 26D that communicates with an ionization section 4, an introduction tube 20 that is connected to a flow channel switching valve 16 in a supercritical fluid extraction section 2 and inserted into the vacuum chamber 26D, and a laser irradiator 28 that emits, through an optical window 29 formed in the vacuum chamber 26D, carbonic acid gas laser light which heats up supercritical carbon dioxide flowing out of the introduction tube 20.

Thus, the supercritical carbon dioxide may be heated by carbonic acid gas laser light.

Embodiment 2

The following description will discuss another embodiment of the present invention. Note that, for convenience of explanation, members which have functions identical to those of the members described in the foregoing embodiment are given respective identical reference numerals, and descriptions of such members will not be repeated.

Figure 11:
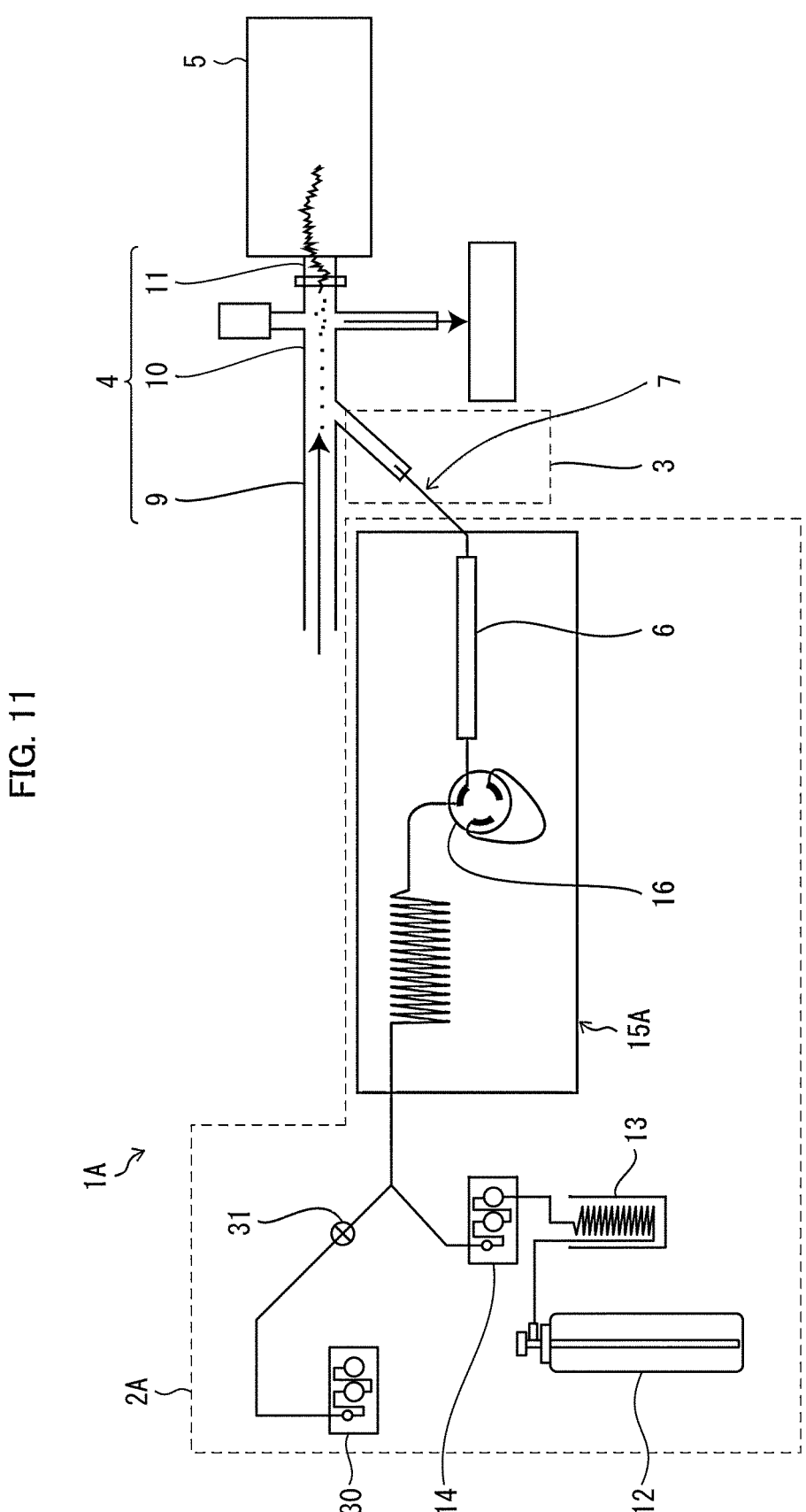
FIG. 11 is a configuration diagram illustrating a mass spectrometer in accordance with Embodiment 2.

FIG. 11 is a configuration diagram illustrating a mass spectrometer 1A in accordance with Embodiment 2. The mass spectrometer 1A includes a supercritical fluid extraction section 2A. The supercritical fluid extraction section 2A includes a chromatography column 6 for separating supercritical carbon dioxide in which a subject compound for mass spectrometry is extracted by the flow channel switching valve 16. The flow channel switching valve 16 and the chromatography column 6 are disposed in an oven 15A. The supercritical fluid extraction section 2A is provided with a pump 30 for supplying a solvent through a valve 31.

A supercritical fluid introduction section 3 introduces the supercritical carbon dioxide supplied from the chromatography column 6 to vacuum in a reaction section 10 provided in an ionization section 4.

Supercritical chromatography can (theoretically) achieve separation in a measurement time which is $1/10$ of that of liquid chromatography (HPLC). In addition, supercritical carbon dioxide ($scCO_2$) that is generally used has a low background of the solvent itself and is suitable for highly sensitive analysis.

As the supercritical fluid extraction section 2A, it is possible to use a known device for supercritical fluid chromatography (SFC).

Embodiment 3

The following description will discuss another embodiment of the present invention. Note that, for convenience of explanation, members which have functions identical to those of the members described in the foregoing embodiments are given respective identical reference numerals, and descriptions of such members will not be repeated.

Figure 12:
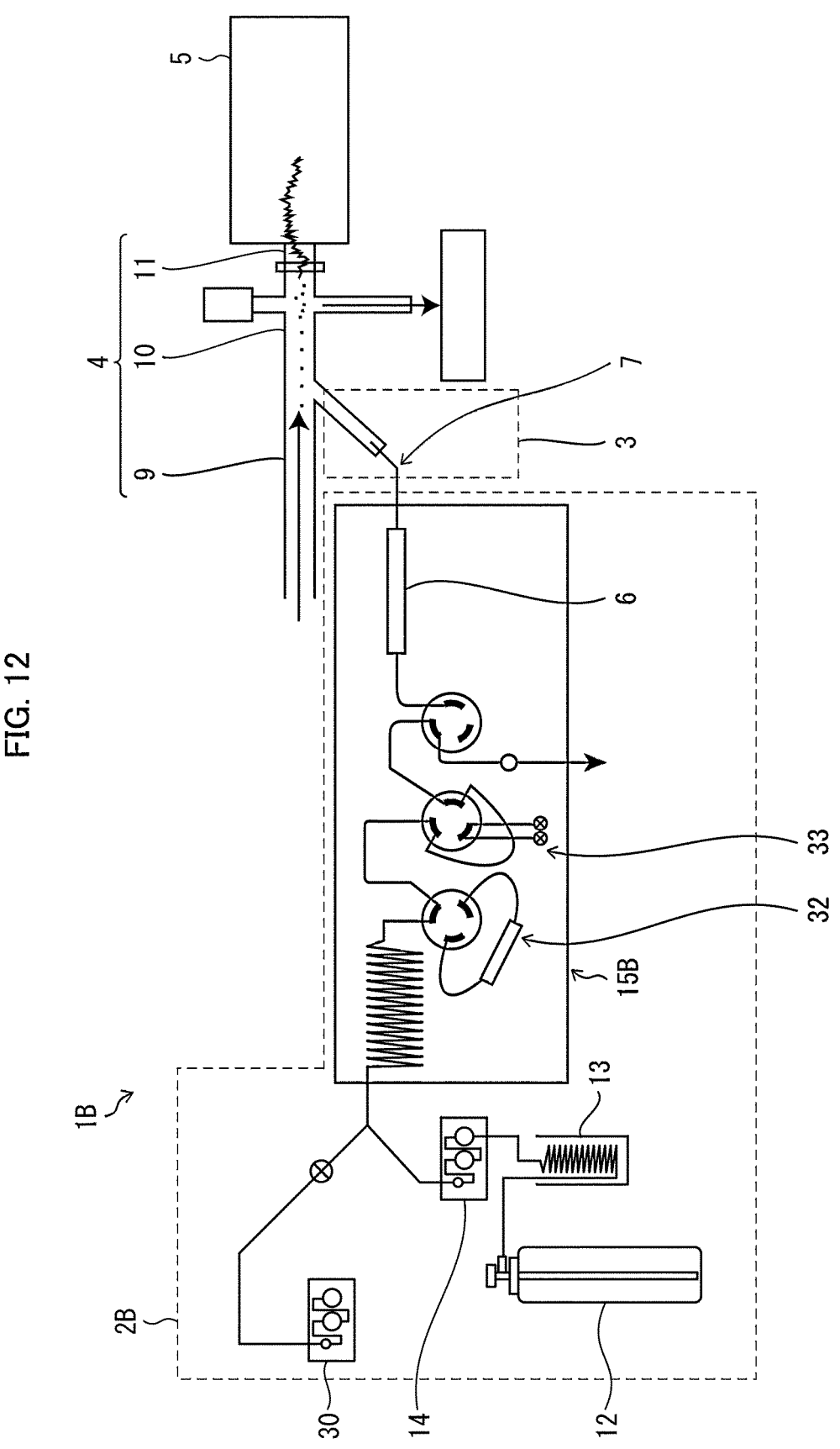
FIG. 12 is a configuration diagram illustrating a mass spectrometer in accordance with Embodiment 3.
Figure 13:
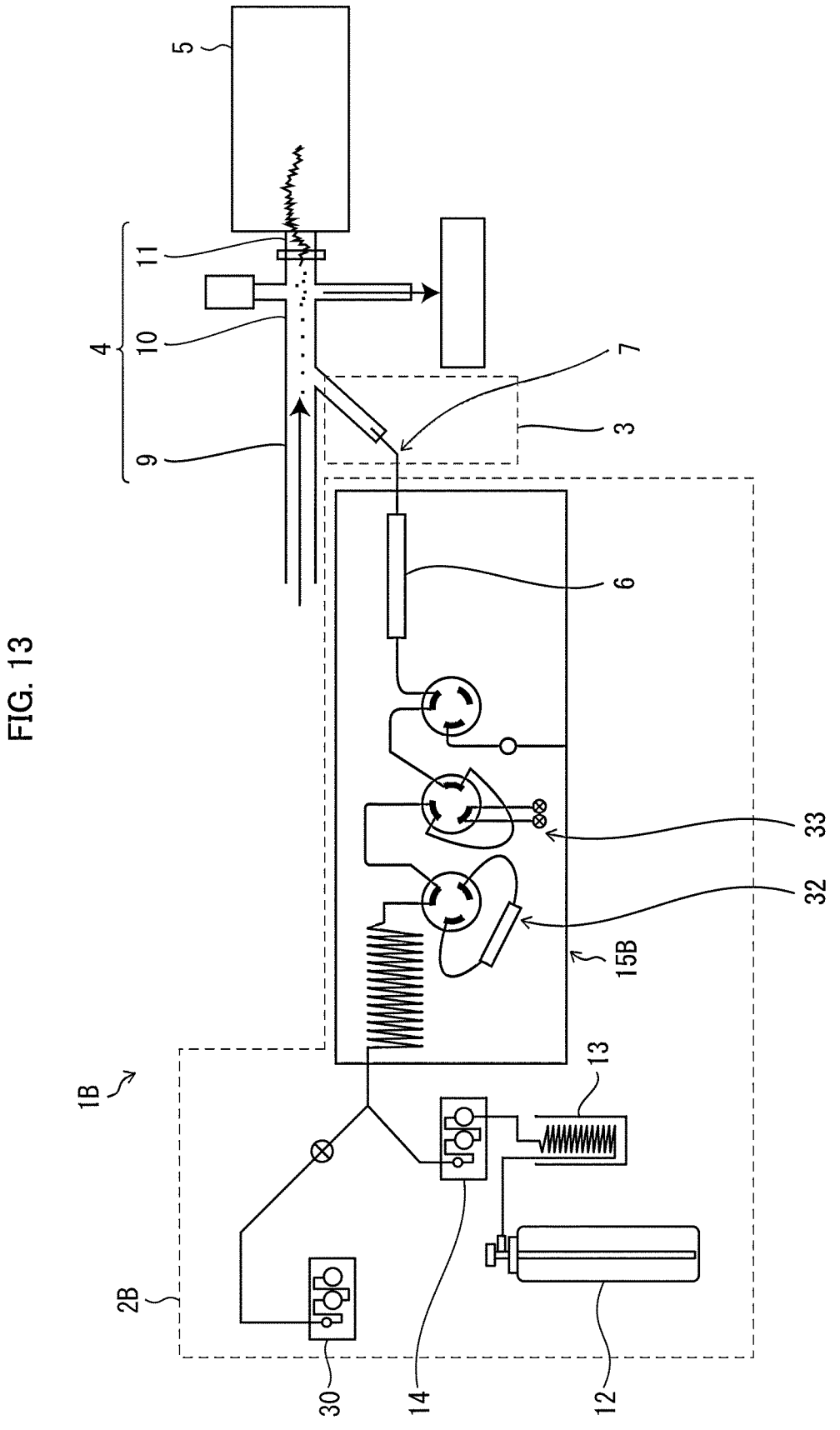
FIG. 13 is a diagram for describing operation of the mass spectrometer.

FIG. 12 is a configuration diagram illustrating a mass spectrometer 1B in accordance with Embodiment 3. FIG. 13 is a diagram for describing operation of the mass spectrometer 1B.

The mass spectrometer 1B includes a supercritical fluid extraction section 2B. The supercritical fluid extraction section 2B includes an oven 15B. The oven 15B includes an extraction vessel 32 and an injection valve 33.

Supercritical fluid extraction (SFE) of a solid sample set in the extraction vessel 32 is carried out, and the solute is maintained and concentrated while a temperature difference and a pressure difference are generated in a sample loop of the injection valve 33. Subsequently, as illustrated in FIG. 13, a flow channel is switched to the chromatography column 6 side for supercritical fluid chromatography (SFC) while maintaining the sample in the sample loop in the supercritical state. Subsequently, equilibration of the chromatography column 6 is waited for, and then the sample in the injection valve 33 is injected, and a chromatogram is obtained.

The operation can be simplified by using another supercritical carbon dioxide ($scCO_2$) fluid delivery system for the supercritical fluid chromatography (SFC) flow channel.

As the supercritical fluid extraction section 2B, it is possible to use a known device for supercritical fluid extraction (SFE) and supercritical fluid chromatography (SFC).

Figure 14:
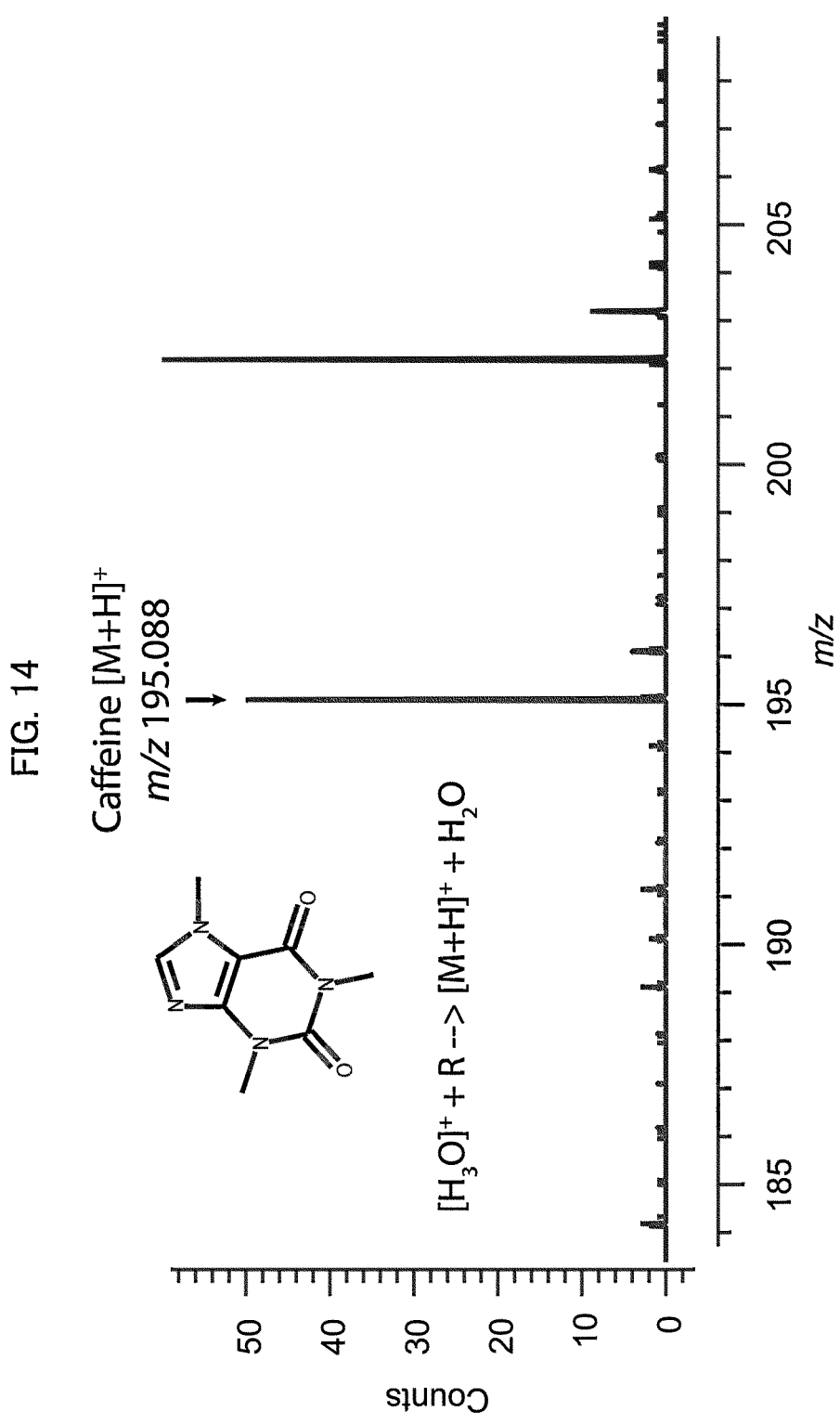
FIG. 14 is a graph showing a result of mass spectrometry by the mass spectrometer in which a subject compound is caffeine.
Figure 15:
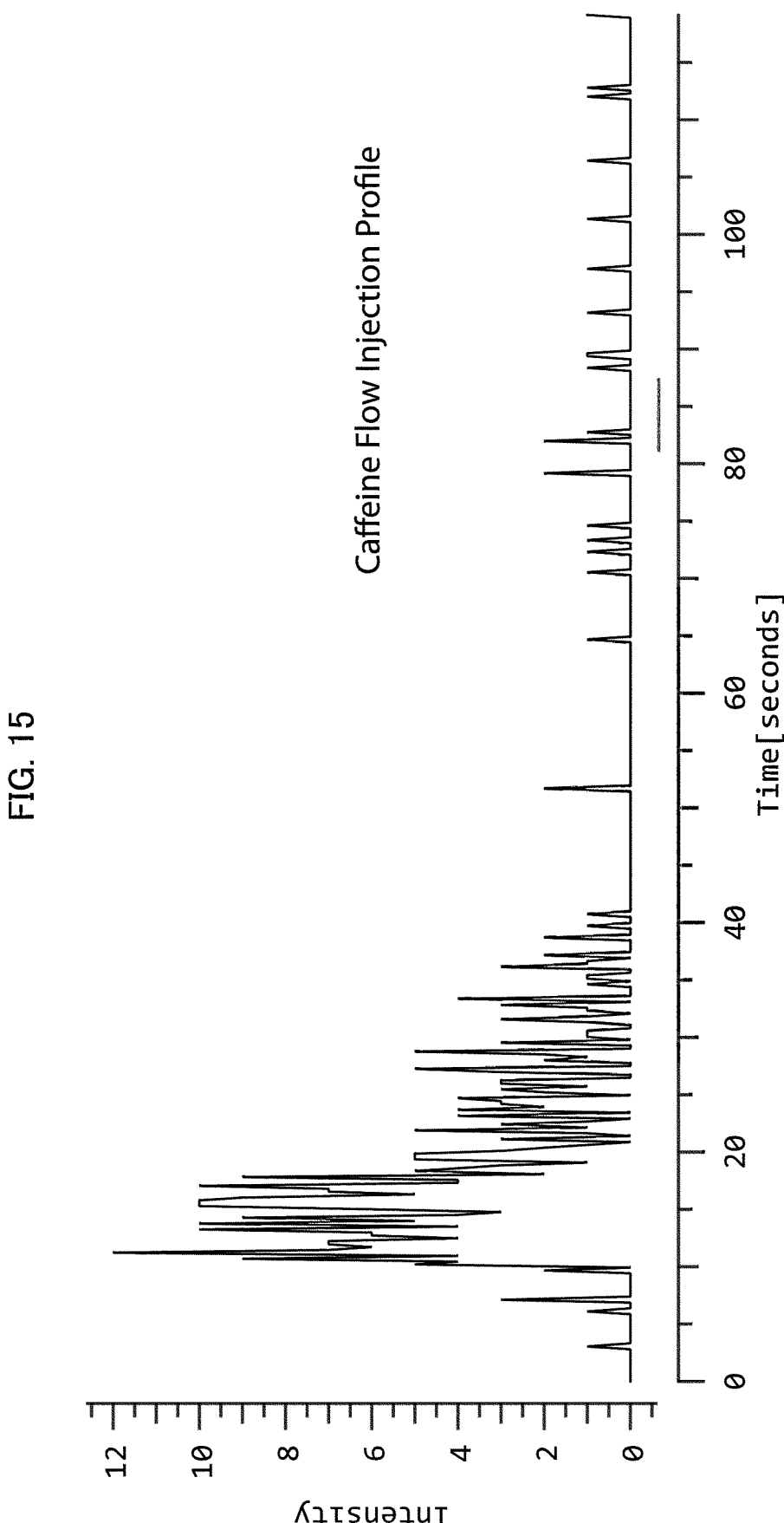
FIG. 15 is a graph showing a flow injection profile in which a subject compound is caffeine.

FIG. 14 is a graph showing a result of mass spectrometry by the mass spectrometer 1B in which a subject compound is caffeine. FIG. 15 is a graph showing a flow injection profile in which a subject compound is caffeine.

A solid sample (subject compound) that is set in the extraction vessel 32 of the mass spectrometer 1B may be, for example, caffeine.

A proton affinity of caffeine is greater than the proton affinity of water. Therefore, a reaction of Formula 1 below, which has been described above, proceeds rightward to add a proton to the subject compound (caffeine):

$$[H_3O]^+ + R \rightarrow [RH]^+ + H_2O \qquad \text{(Formula 1)}.$$

As illustrated in FIG. 14 and FIG. 15, it is possible to carry out mass spectrometry of caffeine by the mass spectrometer 1B including the supercritical fluid extraction section 2B based on supercritical fluid chromatography (SFC), an ionization section 4, and a mass measurement section 5.

Figure 16:
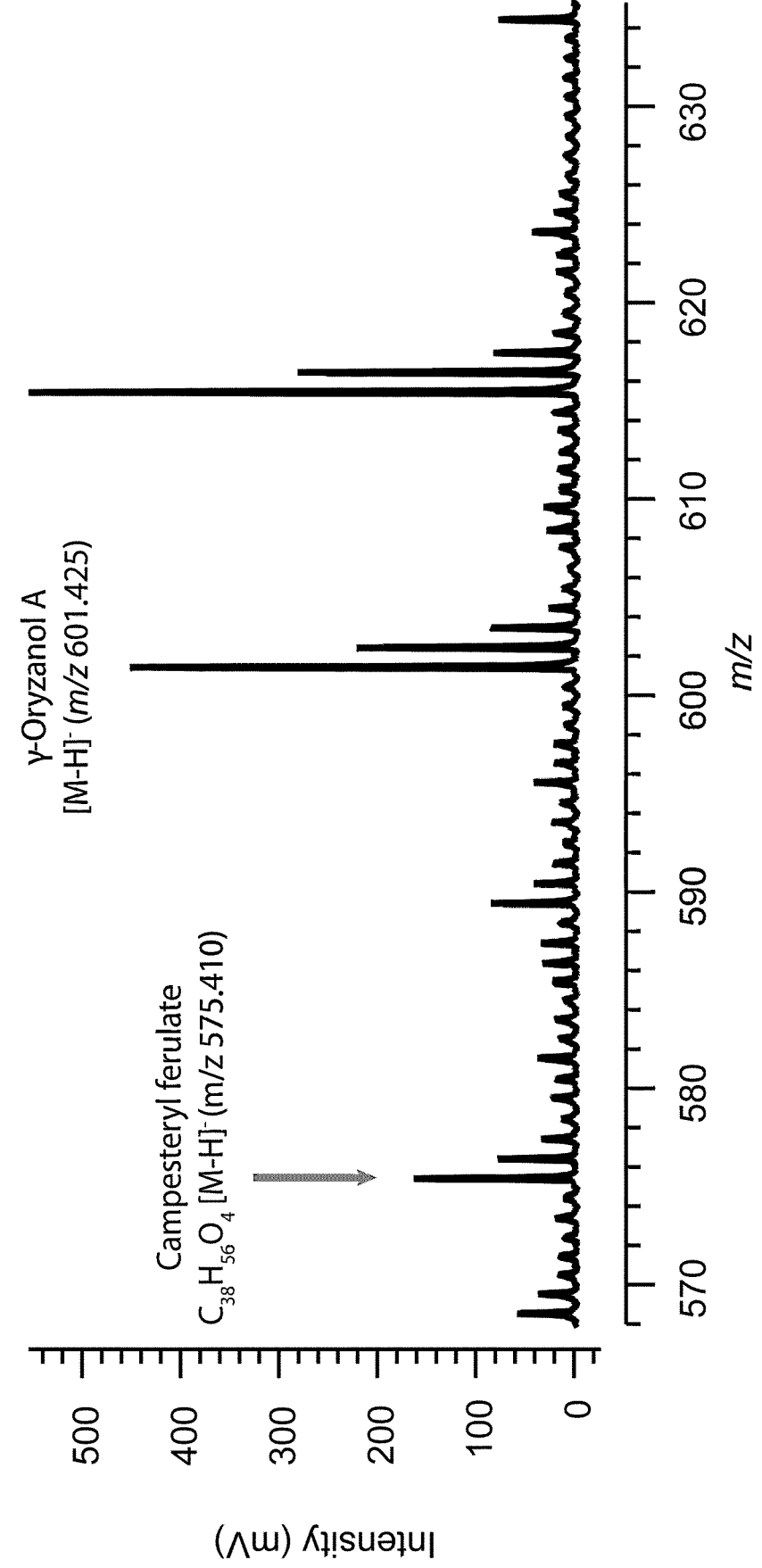
FIG. 16 is a graph showing a result of mass spectrometry by the mass spectrometer in which a subject compound is oryzanol.
Figure 17:
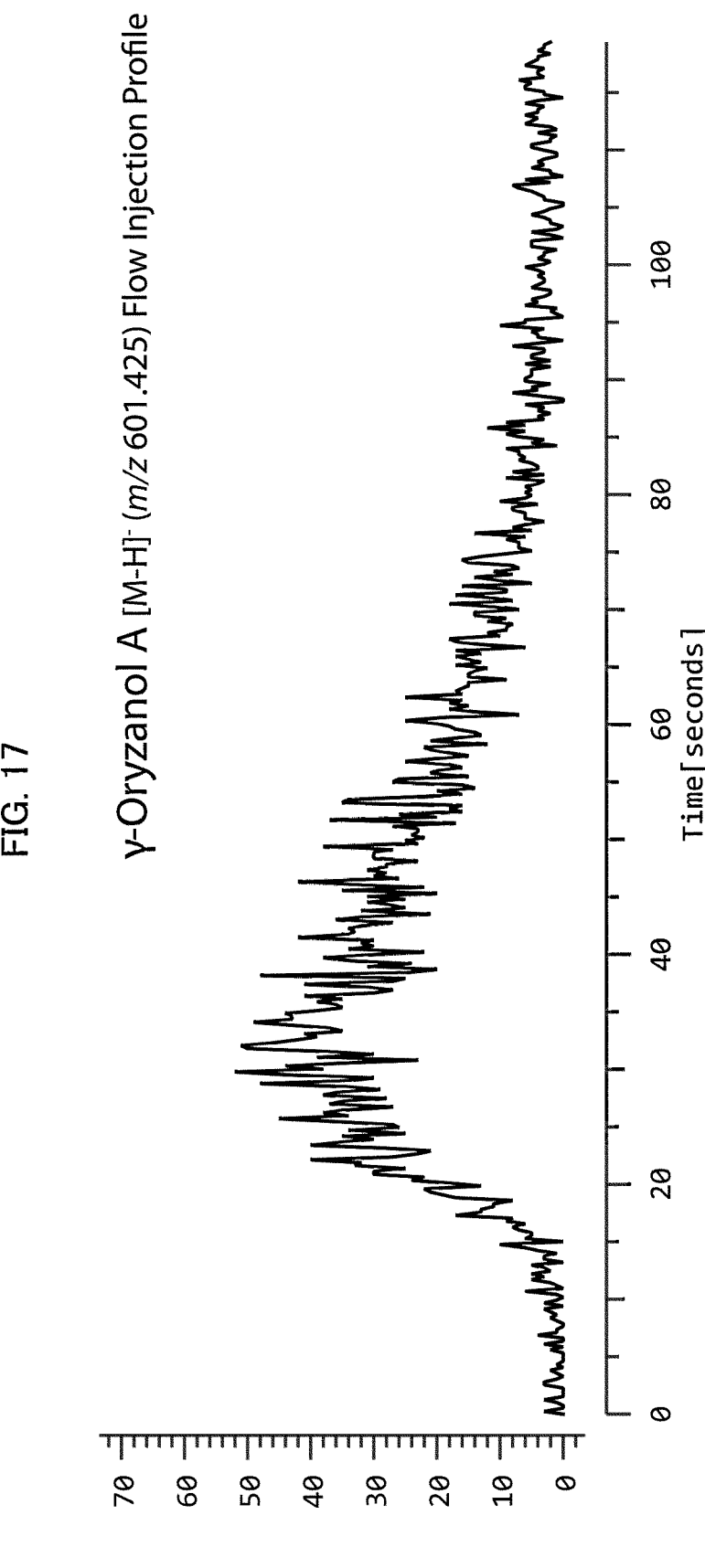
FIG. 17 is a graph showing a flow injection profile in which a subject compound is oryzanol.
Figure 18:
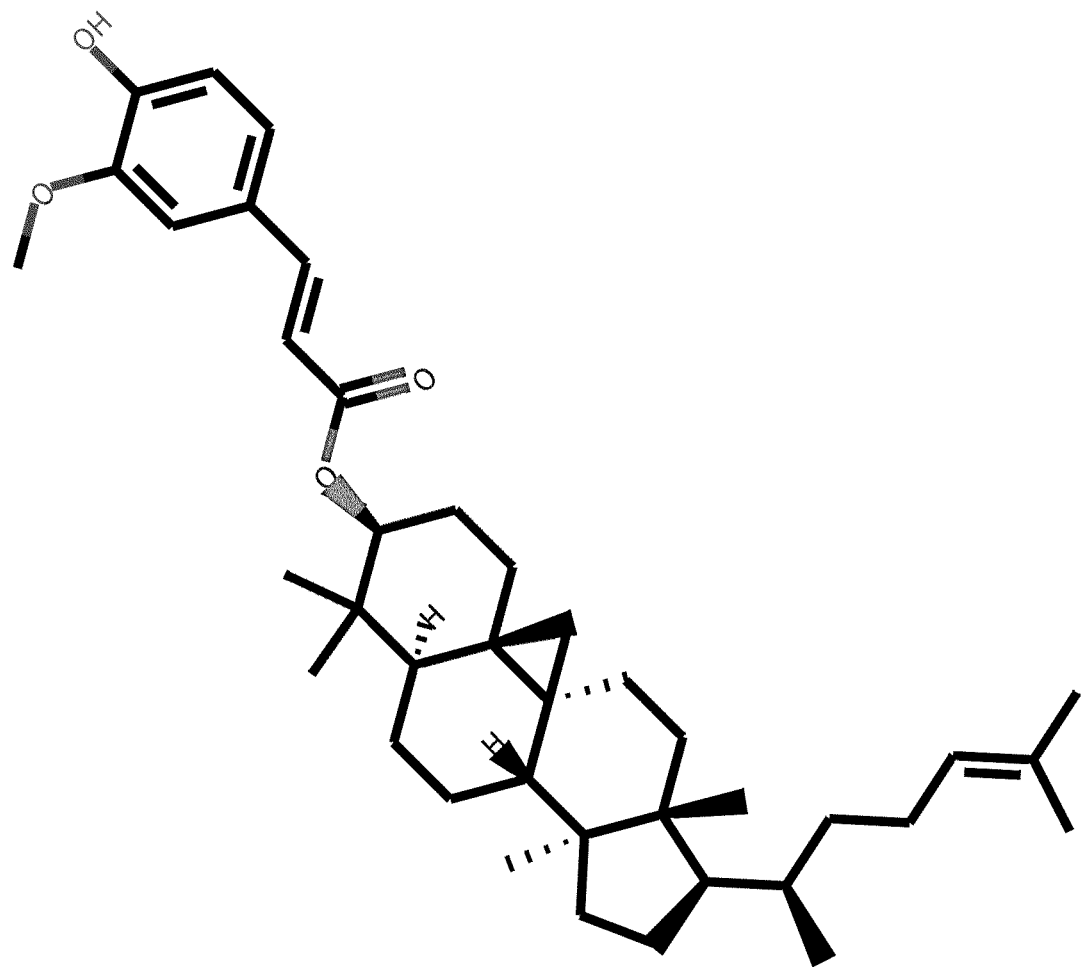
FIG. 18 is a diagram illustrating a chemical structure of the oryzanol.

FIG. 16 is a graph showing a result of mass spectrometry by the mass spectrometer 1B in which a subject compound is oryzanol. FIG. 17 is a graph showing a flow injection profile in which a subject compound is oryzanol. FIG. 18 is a diagram illustrating a chemical structure of the oryzanol.

In Formula 2: $[OH]^- + RH \rightarrow [R]^- + H_2O$ described above, which represents a molecular reaction for abstracting a proton out of a subject compound, the subject compound RH may be oryzanol illustrated in FIG. 18. As illustrated in FIG. 16 and FIG. 17, it is possible to carry out mass spectrometry of oryzanol by the mass spectrometer 1B including the supercritical fluid extraction section 2B based on supercritical fluid chromatography (SFC), the ionization section 4, and the mass measurement section 5.

Embodiment 4

In Embodiments 1 through 3, the examples have been described in which carbon dioxide is in the supercritical state by being kept at not lower than the critical pressure and at not lower than the critical temperature in the ovens 15, 15A, and 15B. However, the oven 15, 15A, and 15B may be adjusted to a temperature at which carbon dioxide is in a subcritical state. Specifically, carbon dioxide cooled by the cooling section 13 to a temperature lower than −50° C. may be set to a temperature of not lower than −50° C. and not higher than 0° C. by the ovens 15, 15A, and 15B.

In a case where the chromatography column 6 is provided as in Embodiments 2 and 3, the temperature of the ovens 15A and 15B may be adjusted so that the temperature of the chromatography column 6 is not higher than 0° C. In a column that can be used for the chromatography column 6 (e.g., ODS (C18) column), it seems that, in a low-temperature region (e.g., not higher than 0° C.), high column efficiency (high number of theoretical plates) can be maintained by using a packing material having a small particle size, for example, by using pyrene and phenanthrene which are polycyclic aromatic substances. By expanding an operating temperature range of the column 6 in chromatography, selectivity can be expanded, the possibility of resolution of a compound without using a modifier (organic solvent) can be increased, and interference by an organic solvent with respect to PTR ionization can be reduced. In this case, it is possible to employ a configuration in which a temperature of the fluid is increased to approximately 40° C. in the heating section 7 in the posterior stage, and thus the fluid is made into a supercritical fluid.

Embodiment 5

Figure 19:
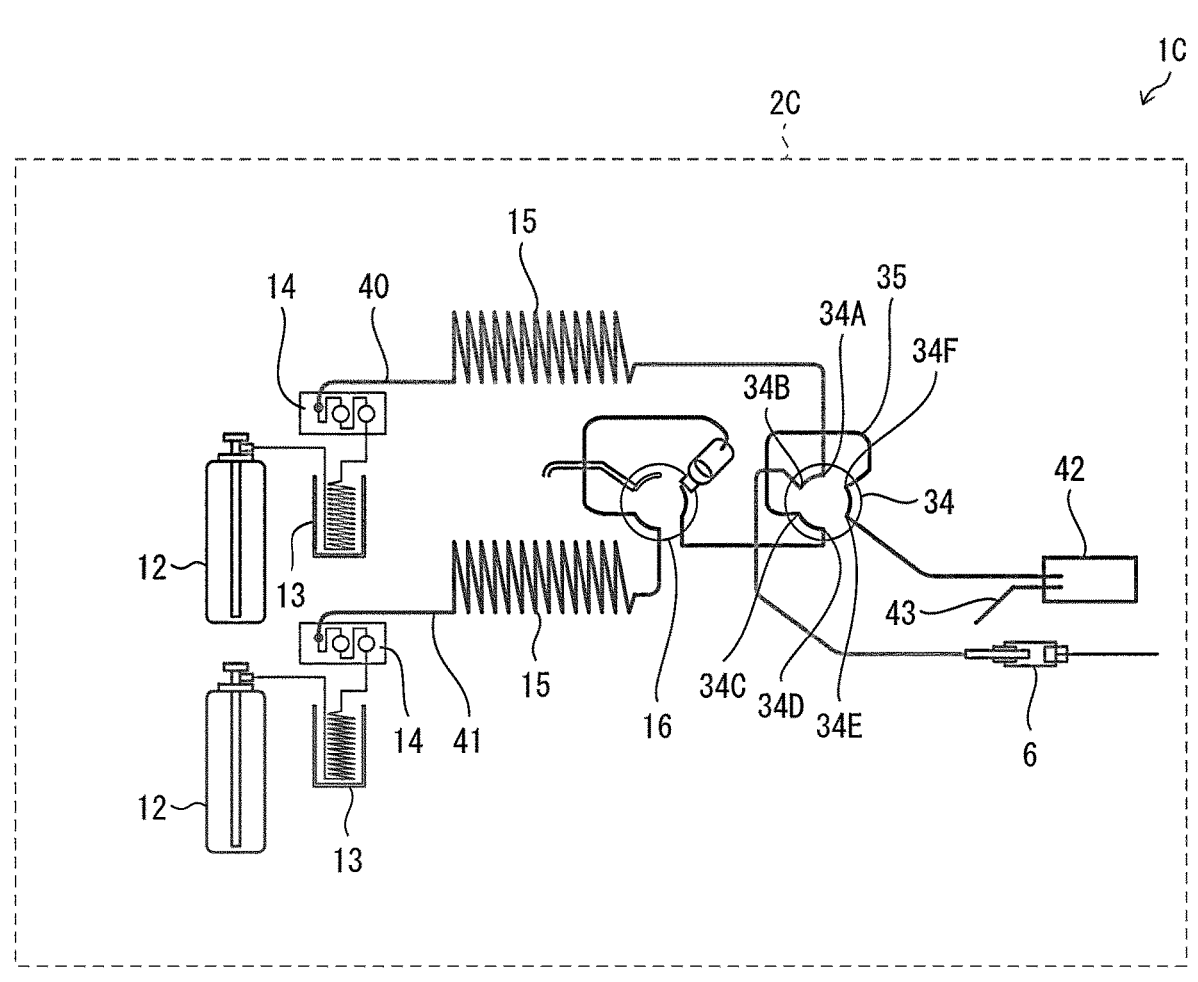
FIG. 19 is a configuration diagram illustrating a supercritical fluid extraction/chromatographic separation section in a mass spectrometer in accordance with Embodiment 5.
Figure 20:
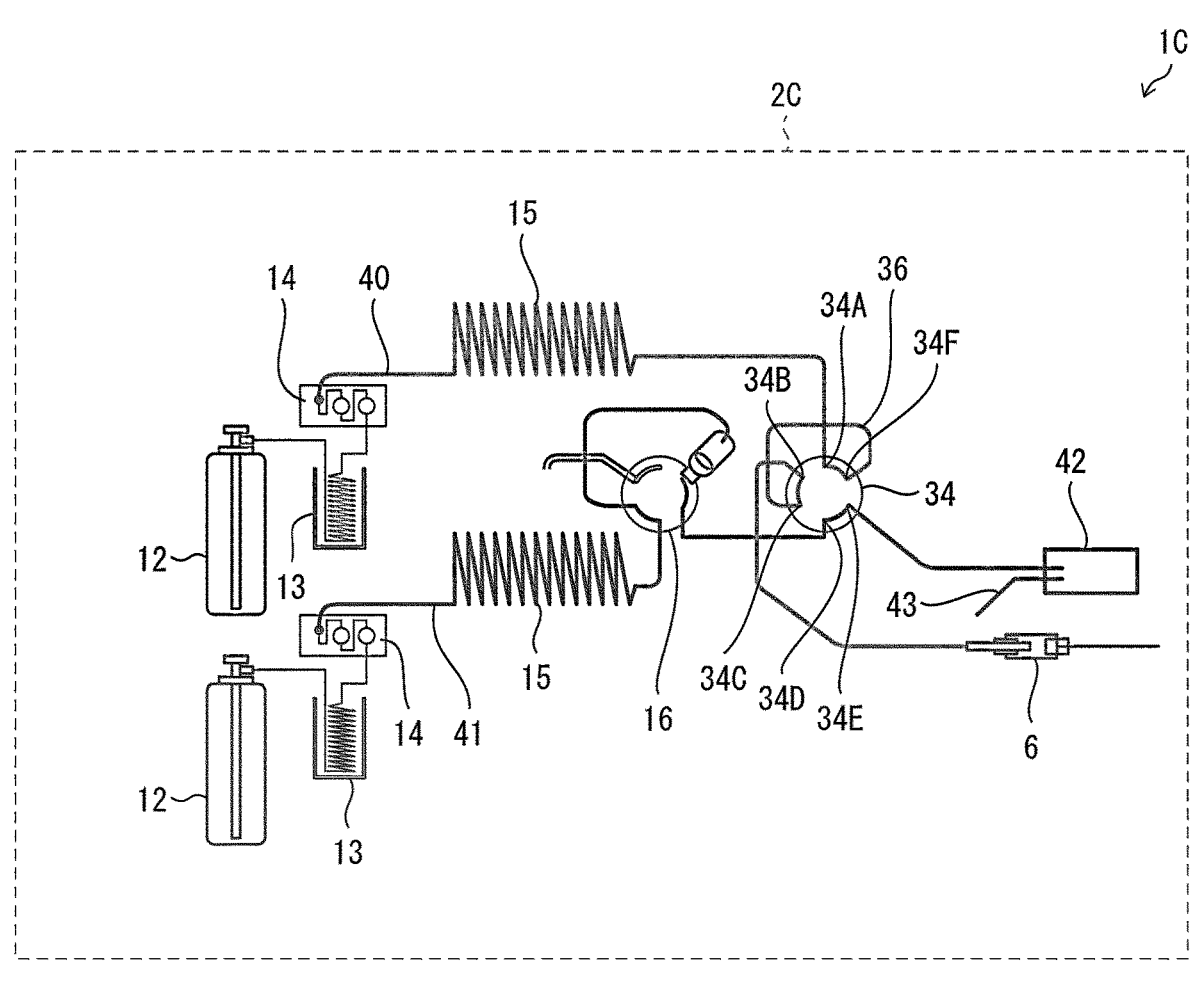
FIG. 20 is a configuration diagram illustrating the supercritical fluid extraction/chromatographic separation section in the mass spectrometer in accordance with Embodiment 5.

In Embodiments 1 through 4, the aspect has been described in which the flow channel for supercritical fluid extraction (SFE) is connected in series with the flow channel for supercritical fluid chromatography (SFC), and thus a single fluid delivery system is operated. However, the present invention is not limited to this. The flow channel for supercritical fluid extraction (SFE) and the flow channel for supercritical fluid chromatography (SFC) may each be independent. FIG. 19 and FIG. 20 are configuration diagrams each illustrating a supercritical fluid extraction/chromatography section 2C that is a sample introduction section to a mass spectrometer in accordance with Embodiment 5. Hereinafter, the supercritical fluid extraction/chromatography section 2C is also referred to as a sample introduction section 2C. Constituent elements similar to those described above will be given the same reference signs, and detailed descriptions of such constituent elements will not be repeated here.

The sample introduction section 2C to the mass spectrometer is constituted by a fluid delivery system in which a flow channel for supercritical fluid extraction (SFE) and a flow channel for supercritical fluid chromatography (SFC) are independent of each other. For example, in FIG. 19 and FIG. 20, the sample introduction section 2C includes an SFE flow channel 41 for supercritical fluid extraction (SFE) and an SFC flow channel 40 for supercritical fluid chromatography (SFC). The sample introduction section 2C to the mass spectrometer includes a flow channel switching valve 16 and a flow channel switching valve 34. The flow channel switching valve 34 includes a sample retention loop 35, and a part which is the posterior stage of the flow channel switching valve 34 is connected to the chromatography column 6 and connected to an ion source.

The sample introduction section 2C in FIG. 19 has a flow channel for discarding a fluid containing an extract from the SFE flow channel 41 for carrying out extraction (supercritical fluid extraction step) by supercritical fluid extraction (SFE) with the flow channel switching valve 16 to a drain via a back pressure regulator 42 and via the sample retention loop 35 of the flow channel switching valve 34 that is disposed in the SFC flow channel 40 independent of the SFE flow channel 41. By repositioning the flow channel switching valve 34 from loading to injection after a predetermined time period from start of SFE, an SFE extract which has been retained in the sample retention loop 35 at that point in time is transferred to the SFC flow channel, and chromatographic separation is initiated. By setting pressure of the back pressure regulator 42, it is also actually possible to close an outlet of the SFE flow channel 41.

In the supercritical fluid extraction/chromatography section 2C illustrated in FIG. 19, the supercritical fluid that has passed through the oven 15 of the SFC flow channel 40 passes through a flow channel connecting a port 34A to a port 34B of the flow channel switching valve 34, and is injected into the chromatography column 6. The supercritical fluid which has passed through the oven 15 of the SFE flow channel 41 is subjected to SFE extraction of the sample with the flow channel switching valve 16, and passes through (i) a flow channel connecting a port 34D to a port 34C of the flow channel switching valve 34, (ii) the sample retention loop 35 connecting the port 34C to a port 34F, and (iii) a flow channel connecting the port 34F to a port 34E. Subsequently, the supercritical fluid is introduced from the back pressure regulator 42 to an outlet flow channel 43.

In the supercritical fluid extraction/chromatography section 2C illustrated in FIG. 20, the supercritical fluid that has passed through the oven 15 of the SFC flow channel 40 is injected into the chromatography column 6 by switching the flow channel switching valve 34 and making the sample retention loop 36 in-line. Moreover, the supercritical fluid which has passed through the oven 15 of the SFE flow channel 41 is introduced from the back pressure regulator 42 to the outlet flow channel 43.

From the sample extracted by SFE, a portion of the sample can be introduced to the chromatography column 6 as a narrow sample band by the sample retention loop 36.

It is preferable that the SFC flow channel 40 is maintained at the same temperature, including the chromatography column 6 and the flow channel switching valve 34. As in Embodiments 2 and 3, from the posterior stage of the pump 14, a flow channel to the chromatography column 6 may be placed in the oven, and the temperature may be kept constant.

Thus, by independently providing the SFE flow channel 41 for supercritical fluid extraction (SFE) by the flow channel switching valve 16 and the SFC flow channel 40 of supercritical fluid chromatography (SFC) by the chromatography column 6, it is possible to improve a throughput of mass spectrometry. Moreover, it is possible to introduce a sample at a predetermined stage in the separation process by supercritical fluid extraction (SFE) to supercritical fluid chromatography (SFC), and this improves column efficiency, which increases the peak resolution of subject compounds.

In supercritical fluid extraction (SFE), it is possible to extract solid samples (e.g., cellulose acetate membranes with fixed cells, filter paper dishes, and the like), fat-soluble components in aqueous liquid samples, and the like. However, by introducing a wide variety of substances to the ionization section 4 as a PTR ion source, there is a possibility of causing a severe carryover, which reduces analytical sample throughput. According to a mass spectrometer 1C in accordance with the present embodiment, it is possible, by the flow channel switching valve 34 that switches the flow channel, to select and dilute the extracted sample by SFE, and it is possible to minimize the cases where unwanted substances and high-concentration subject compounds to be introduced into the ionization section 4.

Apart from the chromatography column 6, which is provided to the SFC flow channel 40 for supercritical fluid chromatography (SFC), another chromatography column for supercritical fluid chromatography (SFC) may be added in a portion of the SFE flow channel 41, which separate extracts in series followed by a supercritical fluid extraction (SFE).

The present invention is not limited to the embodiments, but can be altered by a skilled person in the art within the scope of the claims. The present invention also encompasses, in its technical scope, any embodiment derived by combining technical means disclosed in differing embodiments.

In order to attain the object, the mass spectrometer in accordance with an aspect of the present invention includes: a supercritical fluid introduction section that is provided for introducing and releasing, to vacuum, a supercritical fluid in which a subject compound for mass spectrometry is extracted; an ionization section that ionizes the subject compound which is extracted in the supercritical fluid, the ionization being carried out in the vacuum by a molecular reaction involving proton transfer; and a mass measurement section that measures a mass of the subject compound which has been ionized.

According to this feature, the subject compound extracted in the supercritical fluid introduced and released to the vacuum is ionized in the vacuum by a molecular reaction involving proton transfer. Therefore, it is possible to carry out mass spectrometry of wide variety of subject compounds to be analyzed each of which is extracted in a supercritical fluid.

The mass spectrometer, in accordance with an aspect of the present invention, preferably further includes: a supercritical fluid extraction section that, before the supercritical fluid is introduced to the vacuum, generates the supercritical fluid, extracts the subject compound in the supercritical fluid.

According to the configuration, it is possible to easily introduce the supercritical fluid, which contains the subject compound into mass spectrometry.

In the mass spectrometer in accordance with an aspect of the present invention, it is preferable that: the ionization section includes a regent ion generation section that generates regent ions for adding a proton to the subject compound or for abstracting a proton out of the subject compound, a reaction section for causing a molecular reaction between the regent ions and the subject compound, and an introduction section that introduces the subject compound which has been ionized by the molecular reaction to the mass measurement section.

According to the configuration, it is possible to cause a molecular reaction of the subject compound involving proton transfer.

In the mass spectrometer, in accordance with an aspect of the present invention, it is preferable that: the supercritical fluid introduction section heats up the supercritical fluid and introduces the supercritical fluid to the vacuum.

According to the configuration, by heating up the supercritical fluid, the subject compound, which is extracted in the supercritical fluid, can be rapidly diffused in space and stably introduced to the vacuum.

In the mass spectrometer, in accordance with an aspect of the present invention, it is preferable that: the supercritical fluid introduction section introduces the supercritical fluid to the vacuum while maintaining the pressure of the supercritical fluid with a valve.

According to the configuration, it is possible to stably introduce the supercritical fluid to the vacuum by maintaining the pressure of the supercritical fluid.

In the mass spectrometer, in accordance with an aspect of the present invention, it is preferable that: a proton affinity of the supercritical fluid is not greater than a proton affinity of the regent ions.

According to the configuration, the supercritical fluid has the proton affinity not greater than the proton affinity of the regent ions. Therefore, no molecular reaction involving proton transfer occurs. Therefore, it is possible to avoid a case where ionization of the subject compound by a molecular reaction involving proton transfer is inhibited by ionization of the supercritical fluid that is introduced in a large amount. Therefore, the subject compound is efficiently ionized.

In the mass spectrometer in accordance with an aspect of the present invention, it is preferable that: the reagent ions include $H_3O^+$; and the supercritical fluid includes oxygen dioxide.

According to the configuration, the oxygen dioxide has a proton affinity not greater than the proton affinity of water. Therefore, no molecular reaction involving proton transfer occurs. Therefore, supercritical oxygen dioxide will not interfere with the ionization of the subject compound by a molecular reaction involving proton transfer. Therefore, the subject compound is efficiently ionized.

In the mass spectrometer in accordance with an aspect of the present invention, it is preferable that: the reagent ions include $H_3O^+$; and a proton affinity of the subject compound is greater than a proton affinity of water.

According to the configuration, the subject compound has the proton affinity greater than the proton affinity of water. Therefore, a molecular reaction occurs in which the $H_3O^+$ adds a proton to the subject compound or the $H_3O^+$ abstracts a proton out of the subject compound, and thus the subject compound is ionized in a vacuum.

In the mass spectrometer, in accordance with an aspect of the present invention, it is preferable that: the reagent ions include $H_3O^+$; and the ionization step ionizes the subject compound by utilizing proton transfer from the $H_3O^+$ to the subject compound.

According to the configuration, it is possible to ionize the subject compound having a proton affinity greater than the proton affinity of water.

In the mass spectrometer, in accordance with an aspect of the present invention, it is preferable that: the analytes extracted in the supercritical fluid separate by the supercritical fluid chromatography in which the supercritical fluid is used as a mobile phase, and then introduces the supercritical fluid to the vacuum.

According to the configuration, it is possible to carry out mass spectrometry of the subject compound extracted in the supercritical fluid after separation by chromatography.

In order to attain the object, a mass spectrometric method in accordance with an aspect of the present invention includes the steps of: introducing and releasing, to vacuum, a supercritical fluid in which a subject compound for mass spectrometry is extracted; ionizing the subject compound which is held in the supercritical fluid, the ionization being carried out in the vacuum by a molecular reaction involving proton transfer; and measuring a mass of the subject compound which has been ionized.

REFERENCE SIGNS LIST

1: Mass spectrometer
2: Supercritical fluid extraction section
3: Supercritical fluid introduction section
4: Ionization section
5: Mass measurement section
6 Chromatography column
7: Heating section
8: Solenoid valve
9: Reagent ion generation section
10: Reaction section
11: Introduction section
The invention claimed is:

1. A mass spectrometer, comprising:
a supercritical fluid introduction section that is provided for introducing and releasing, to vacuum, a supercritical fluid in which a subject compound for mass spectrometry is extracted and being held;
an ionization section that ionizes the subject compound which is extracted and being held in the supercritical fluid, the ionization being carried out in the vacuum by a molecular reaction involving proton transfer; and
a mass measurement section that measures a mass of the subject compound which has been ionized.

2. The mass spectrometer as set forth in claim 1, further comprising:

a supercritical fluid extraction section that, before the supercritical fluid is introduced to the vacuum, generates the supercritical fluid, extracts the subject compound in the supercritical fluid, the subject compound being held in the supercritical fluid.

3. The mass spectrometer as set forth in claim 1, wherein:
the ionization section includes
a reagent ion generation section that generates reagent ions for adding a proton to the subject compound or for abstracting a proton out of the subject compound,
a reaction section that is provided for causing a molecular reaction between the reagent ions and the subject compound, and
an introduction section that introduces the subject compound which has been ionized by the molecular reaction to the mass measurement section.

4. The mass spectrometer as set forth in claim 1, wherein:
the supercritical fluid introduction section heats up the supercritical fluid and introduces the supercritical fluid to the vacuum.

5. The mass spectrometer as set forth in claim 1, wherein:
the supercritical fluid introduction section introduces the supercritical fluid to the vacuum while maintaining the pressure of the supercritical fluid with a valve.

6. The mass spectrometer as set forth in claim 3, wherein:
a proton affinity of the supercritical fluid is not greater than a proton affinity of the reagent ions.

7. The mass spectrometer as set forth in claim 3, wherein:
the reagent ions include $H_3O^+$; and
the supercritical fluid includes carbon dioxide.

8. The mass spectrometer as set forth in claim 3, wherein:
the reagent ions include $H_3O^+$; and
a proton affinity of the subject compound is greater than a proton affinity of water.

9. The mass spectrometer as set forth in claim 3, wherein:
the reagent ions include $H_3O^+$; and
the ionization section ionizes the subject compound by utilizing proton transfer from the $H_3O^+$ to the subject compound.

10. The mass spectrometer as set forth in claim 1, wherein:
the supercritical fluid introduction section separates the supercritical fluid by chromatography, in which the supercritical fluid is used as a mobile phase and then introduced to the supercritical fluid in the vacuum.

11. A mass spectrometric method, comprising the steps of:
introducing and releasing, to vacuum, a supercritical fluid in which a subject compound for mass spectrometry is extracted;
ionizing the subject compound, which is extracted and is being held in the supercritical fluid, the ionization being carried out in the vacuum by a molecular reaction involving proton transfer; and
measuring a mass of the subject compound which has been ionized.

* * * * *